(12) United States Patent
Hamada

(10) Patent No.: US 9,420,159 B2
(45) Date of Patent: Aug. 16, 2016

(54) DIGITAL PHOTOGRAPHING APPARATUS WITH FOCUS DETECTOR COMPRISING A PHASE DIFFERENCE DETECTOR

(71) Applicant: SAMSUNG ELECTRONICS CO., LTD., Suwon-si, Gyeonggi-do (KR)

(72) Inventor: Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 13/905,426

(22) Filed: May 30, 2013

(65) Prior Publication Data

US 2014/0036139 A1 Feb. 6, 2014

(30) Foreign Application Priority Data

Aug. 1, 2012 (KR) ........................ 10-2012-0084586

(51) Int. Cl.
*H04N 5/232* (2006.01)
*G03B 13/36* (2006.01)
*G02B 7/34* (2006.01)

(52) U.S. Cl.
CPC ............ *H04N 5/23212* (2013.01); *G03B 13/36* (2013.01); *G02B 7/34* (2013.01)

(58) Field of Classification Search
CPC . H04N 5/2353; H04N 5/23212; G03B 13/36; G02B 7/34
See application file for complete search history.

(56) References Cited

U.S. PATENT DOCUMENTS

| 2008/0240701 | A1* | 10/2008 | Kusaka | 396/104 |
| 2011/0267533 | A1* | 11/2011 | Hirose | 348/345 |
| 2012/0133821 | A1* | 5/2012 | Takaiwa | 348/345 |
| 2012/0274835 | A1* | 11/2012 | Ogino et al. | 348/345 |
| 2013/0120643 | A1* | 5/2013 | Tamaki | 348/349 |

FOREIGN PATENT DOCUMENTS

| WO | WO 2011064980 A1 | * | 6/2011 |
| WO | WO 2012018101 A1 | * | 2/2012 |

* cited by examiner

*Primary Examiner* — Dennis Hogue
(74) *Attorney, Agent, or Firm* — Drinker Biddle & Reath LLP

(57) ABSTRACT

A digital photographing apparatus includes: an image pickup lens; an image pickup device that generates an image signal; an iris that controls an amount of the light transmitted through the image pickup lens; a shutter that controls exposure; a focus detector that detects focus using light transmitted through a predetermined exit pupil region of the lens; and a timing unit that controls a time for closing and/or opening the shutter, when the image pickup device outputs image information, where regardless of the time for closing and/or opening the shutter, the focus detector detects a focus when the iris has an iris value for ensuring transmission of a light flux used to detect the focus, after the exposure is finished. To precisely perform auto focus (AF), the digital photographing apparatus performs continuous AF or simultaneously displays a live view in consideration of timing for adjusting the iris and timing for controlling the shutter.

11 Claims, 42 Drawing Sheets

DIGITAL PHOTOGRAPHING APPARATUS WITH FOCUS DETECTOR COMPRISING A PHASE DIFFERENCE DETECTOR

CROSS-REFERENCE TO RELATED PATENT APPLICATION

This application claims the priority benefit of Korean Patent Application No. 10-2012-0084586, filed on Aug. 1, 2012, in the Korean Intellectual Property Office, the disclosure of which is incorporated herein in its entirety by reference.

BACKGROUND

Various embodiments of the invention relate to a digital photographing apparatus.

In digital photographing apparatuses, such as cameras and camcorders, to capture a clear still image or a clear moving picture, it is necessary to correctly focus on a subject. Contrast auto focus (AF) method and phase difference AF method are AF adjusting methods for automatically performing focus adjustment. In general, the contrast AF method is used in a mirrorless camera or a compact camera and the phase difference AF method is used in a single-lens reflex (SLR) camera.

The contrast AF method is a method of acquiring contrast values with respect to image signals generated from an image pickup sensor while photographing by changing a position of a focus lens, and driving the focus lens to a focus lens position of a peak contrast value.

The phase difference AF method further uses a sensing device in addition to an image pickup sensor and detects a focus position from a phase difference of light received by the sensing device.

In a conventional phase difference AF method, a mirror is retracted during continuous photography, and light is not incident on a phase difference AF sensor for a long time during the retraction of the mirror. Thus, AF cannot be correctly performed and a target picture can be out of focus. In addition, if a pellicle mirror is used in a phase difference AF method, it is not necessary to retract the pellicle mirror, but high-speed continuous photography including AF is not performed in consideration of timing for controlling an iris or a shutter. In addition, the high-speed continuous photography is performed only when a position of an iris is fixed, and thus, photography cannot be performed by using a necessary iris value or aperture value. Since only an image that is completely captured is displayed during continuous photography, it is difficult to photograph a subject that is moving in real time.

SUMMARY

Various embodiments of the invention provide a digital photographing apparatus using an auto focus (AF) function to perform continuous photography at a high speed to obtain auto focus (AF) and simultaneously display a live view in consideration of timing for adjusting an iris and timing for controlling a shutter during continuous photography and photography of a moving subject.

According to an embodiment, a digital photographing apparatus includes: an image pickup lens that transmits light from a subject, an image pickup device that captures light transmitted through the image pickup lens to generate an image signal, an iris that controls an amount of the light transmitted through the image pickup lens, a shutter that controls exposure of the image pickup device, a focus detector that detects a focus using light transmitted through a predetermined exit pupil region of the image pickup lens, and a timing unit that controls a time period for shielding the shutter when the image pickup device outputs image information, wherein regardless of the time period for shielding the shutter, the focus detector detects a focus when the iris has an iris value for ensuring transmission of a light flux used to detect the focus, after the exposure of the image pickup device is finished.

After the exposure of the image pickup device is finished, when the iris is being restored to an open state, if an iris value required to detect the focus is satisfied, the focus detector may detect the focus regardless of the time period for shielding the shutter.

The digital photographing apparatus may be a digital single-lens translucent camera or a mirrorless camera.

The digital photographing apparatus may further include a display unit that displays a live view during continuous photography.

After the exposure is finished, while the image pickup device outputs the image information, the iris may be also adjusted.

Before photography is performed, the iris may be fixed to have an iris value that makes brightness lighter than an iris value required to detect phase difference focuses.

The focus detector may also detect the focus when the image pickup device outputs the image information.

The focus detector may also detect the focus when the image pickup device is exposed.

The focus detector may include: a fixed mirror that reflects received light having a predetermined wavelength, and a light receiver that receives reflected light that is reflected by the fixed mirror, wherein the focus is detected using a passive phase difference auto focus (AF) method using the reflected light.

The focus detector may include: a light-transmitting unit that transmits light having a predetermined wavelength through the subject; a receiver that receives reflected light of the light transmitted to the subject; and a fixed mirror that reflects light that is transmitted or received, wherein the focus is detected using an active phase difference AF method that uses a difference between reflected light that is transmitted to the subject and normal light reflected by the subject.

The fixed mirror may be a translucent mirror including an optical film, and may be inclined or vertically provided in front of the image pickup device.

The optical film may include a diffractive optical element (DOE) or a holographic optical element (HOE).

The HOE may non-specularly reflect light or only reflects light having a predetermined wavelength.

The focus detector may control the shutter to be opened during photography of a video image to continually detect the focus.

The focus detector may include a phase difference detecting pixel that detects a phase difference of the image pickup device, and the focus may be detected using an image plane phase difference AF method that uses light received by the phase difference detecting pixel.

The focus detector may detect the focus using the image plane phase difference AF method while displaying of the live view or during photography when the shutter is opened.

According to embodiment, a digital photographing apparatus includes: an image pickup lens that transmits light from a subject, an image pickup device that captures light transmitted through the image pickup lens to generate an image signal, an iris that controls an amount of the light transmitted through the image pickup lens, a shutter that controls exposure of the image pickup device, an image plane phase difference focus detector that detects a focus using light transmitted through a predetermined exit pupil region of the image pickup lens, and a controller that controls a time period for shielding the shutter when the image pickup device outputs image information, wherein the image plane phase difference focus detector detects a focus regardless of a time period for restoring the iris to an open state.

The image plane phase difference focus detector may correct a focus detecting error generated by an iris value while detecting the focus.

The focus detector may also detect the focus by using an image plane phase difference AF method while displaying of a live view or during photography.

According to another embodiment, a digital photographing apparatus includes: an image pickup lens that transmits light from a subject, an image pickup device that captures light transmitted through the image pickup lens to generate an image signal, an iris that controls an amount of the light transmitted through the image pickup lens, a shutter that controls exposure of the image pickup device, a through the lens (TTL) phase difference focus detector that detects a focus using light transmitted through a predetermined exit pupil region of the image pickup lens, and a controller that controls a time period for shielding the shutter when the image pickup device outputs image information, wherein the TTL phase difference focus detector determines a time period when the shutter is not moving and detects the focus when the iris is adjusted to detect the focus using a TTL phase difference AF method.

The digital photographing apparatus may further include a display unit that displays a live view during continuous photography.

BRIEF DESCRIPTION OF THE DRAWINGS

The above and other features and advantages will become more apparent by describing in detail exemplary embodiments thereof with reference to the attached drawings in which.

DETAILED DESCRIPTION

Figure 1:
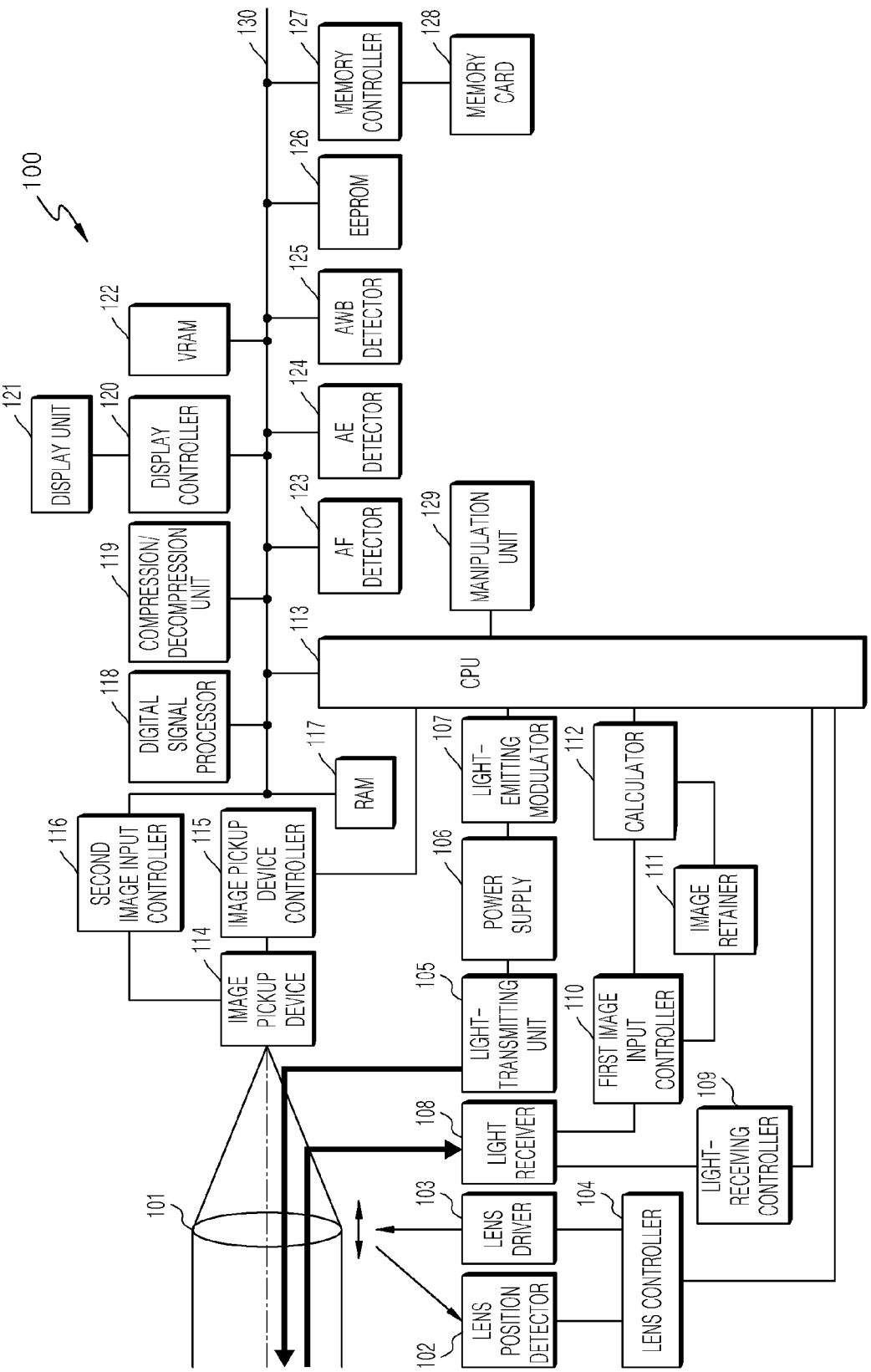
FIG. 1 is a block diagram of a digital photographing apparatus using a through the lens (TTL) active phase difference auto focus (AF) method, according to an embodiment.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of various embodiments of the invention, certain detailed explanations of related art are omitted when it is deemed that they may unnecessarily obscure the essence of the invention.

Hereinafter, the invention will be described in detail by explaining exemplary embodiments of the invention with reference to the attached drawings. The same reference numerals in the drawings denote like elements, and a repeated explanation thereof will not be given.

FIG. 1 is a block diagram of a digital photographing apparatus 100 using a through the lens (TTL) active phase difference auto focus (AF) method, according to an embodiment.

Referring to FIG. 1, the digital photographing apparatus 100 includes an image pickup lens 101, a lens position detector 102, a lens driver 103, a lens controller 104, a light-transmitting unit 105, a power supply 106, a light-emitting modulator 107, a light receiver 108, a light-receiving controller 109, a first image input controller 110, an image retainer 111, a calculator 112, a central processing unit (CPU) 113, an image pickup device 114, an image pickup device controller 115, a second image input controller 116, a random access memory (RAM) 117, a digital signal processor 118, a compression/decompression unit 119, a display controller 120, a display unit 121, video random access memory (VRAM) 122, an AF detector 123, an auto exposure (AE) detector 124, an auto white balance (AWB) detector 125, an electrically erasable programmable read-only memory (EEPROM) 126, a memory controller 127, a memory card 128, a manipulation unit 129, a bus line 130, and so on.

The digital photographing apparatus 100 may be applied not only to a digital single lens reflex camera, but also to a digital apparatus, such as a compact digital camera, a digital single-lens translucent camera or a mirrorless camera, which is a hybrid camera formed by combining the advantages of a compact digital camera and a single lens reflex camera, a camera phone, a smart phone, a personal digital assistant (PDA), or a portable multimedia player (PMP).

The image pickup lens 101 includes a focus lens and is capable of adjusting a focus by driving the focus lens.

The lens position detector 102 detects a position of the focus lens and transmits position information to the lens controller 104. The lens driver 103 drives the focus lens according to a control signal or command from the lens controller 104.

The lens controller 104 controls an operation of the lens driver 103 and receives the position information from the lens position detector 102. In addition, the lens controller 104 communicates with the CPU 113 to transmit and receive information related to focus detection.

The light-transmitting unit 105 emits light for performing TTL active AF on a subject. The light-transmitting unit 105 limits a speed of the emitted light. For example, the light-transmitting unit 105 emits the light to the subject through an exit pupil region that is at one side of an optical axis of the image pickup lens 101.

The light-transmitting unit 105 may include a light-emitting diode (LED), a laser diode (LD), or the like, as a projector.

The power supply 106 supplies power to the light-transmitting unit 105. The power supply 106 adjusts an intensity of the power supplied to the light-transmitting unit 105 according to a control signal or command from the light-emitting modulator 107 to adjust an intensity of light emitted by the light-transmitting unit 105.

The light-emitting modulator 107 receives a command for a light-emitting pattern of the light emitted by the light-transmitting unit 105 during the TTL active AF, from the CPU 113. The light-emitting modulator 107 controls the power supply 106 to adjust the power supplied to the light-transmitting unit 105 according to the command received from the CPU 113.

The light receiver 108 receives external light that is incident through the image pickup lens 101. In this case, the light receiver 108 uses light that is incident through the exit pupil region (through which the light emitted by the light-transmitting unit 105 is transmitted) and transmitted through another exit pupil region. The light receiver 108 may include a light-receiving device or a light-receiving sensor, as a light receiver.

The light receiver 108 may receive only general external light or light formed by adding the general external light and the light emitted by the light-transmitting unit 105, according to a light-receiving period of time.

The exit pupil region that is used in the light-transmitting unit 105 and the light receiver 108 may be limited within a predetermined F number region.

The light-receiving controller 109 may reset the light receiver 108 to erase accumulated charges or may control the light receiver 108 to output the accumulated charges to the first image input controller 110.

The first image input controller 110 transmits image data formed based on the charges output from the light receiver 108 to the image retainer 111 or the calculator 112. For example, the first image input controller 110 may transmit image data formed based on light formed by adding external light (which is received from the light receiver 108) and light for AF (which is emitted by the light-transmitting unit 105) to the image retainer 111. In addition, the first image input controller 110 may transmit image data based on external light, which is received from the light receiver 108, to the calculator 112.

The image retainer 111 temporally stores the image data based on the charges output from the light receiver 108 and transmits the stored image data to the calculator 112.

The calculator 112 compares the image data transmitted from the image retainer 111 with image data that is transmitted directly from the first image input controller 110 to calculate a phase difference. In detail, the calculator 112 calculates a difference between the image data based on the light for AF, which is emitted by the light-transmitting unit 105, and image data due to external light, and integrates the calculated difference. In addition, the calculator 112 repeats the calculation and performs a focus detection calculation from a final integrated value.

The light-transmitting unit 105, the power supply 106, the light-emitting modulator 107, the light receiver 108, the light-receiving controller 109, the first image input controller 110, the image retainer 111, the calculator 112, and so on may constitute a focus detecting apparatus for performing phase difference AF that uses a TTL active AF method.

The CPU 113 controls an overall operation of the digital photographing apparatus 100.

The image pickup device 114 captures image light of the subject, which is transmitted through the image pickup lens 101, and generates an image signal. The image pickup device 114 may include a plurality of photoelectric conversion devices that are arranged in a matrix form, and a charge transmitting path for moving charges from the photoelectric conversion devices.

The image pickup device controller 115 generates a timing signal and applies the timing signal to the image pickup device 114 so as to control an image pickup operation of the image pickup device 114. In addition, the image pickup device controller 115 controls the image pickup device 114 to sequentially read image signals when accumulation of charges is finished in each scan line of the image pickup device 114.

An AF detector 123, an AE detector 124, and an AWB detector 125 respectively perform an AF process, an AE process, and an AWB process on the image signals output from the second image input controller 116. In this case, the AF detector 123 calculates a contrast evaluation value and performs an AF operation that is a contrast AF method for detecting a focus position.

Although not shown, the image pickup device 114 or the second image input controller 116 may include an element for removing noise from an image signal read from the image pickup device 114 and for amplifying the size of the image signal, an analog/digital (A/D) converter for converting an analog signal into a digital signal, and so on.

The RAM 117 temporally stores image signals output from the second image input controller 116 or various pieces of data.

The digital signal processor 118 performs a series of image signal processes, such as gamma correction, on the image signals output from the second image input controller 116 to generate a captured image or a live view image to be displayed on the display unit 121. In addition, the digital signal processor 118 may perform white balance adjustment of a captured image according to a white balance gain detected by the AWB detector 125.

The compression/decompression unit 119 compresses and decompresses the image signal on which the image signal processes are performed. The compression/decompression unit 119 compresses the image signal in a compression format, such as joint photography experts group (JPEG) compression format or an H.264 compression format. An image file including image data generated by the compression is transmitted to the memory controller 127. The memory controller 127 stores the image file in the memory card 128.

The display controller 120 controls the display unit 121 to output an image. In addition, the display unit 121 displays an image, such as a captured image or a live view image, or various pieces of setting information. The display unit 121 and the display controller 120 may respectively include a liquid crystal display (LCD) and an LCD driver. However, the invention is not limited thereto. For example, the display unit 121 and the display controller 120 may respectively include an organic light-emitting diode (OLED) display and an OLED display driver.

The VRAM 122 may temporally store information about an image displayed on the display unit 121. The EEPROM 126 may store an executable program for controlling the digital photographing apparatus 100 or various pieces of managing information.

The manipulation unit 129 is an element that receives various input commands from a user, for manipulation of the digital photographing apparatus 100. The manipulation unit 129 may include various buttons, such as a shutter release button, a main switch, a mode dial, or a menu button.

The bus line 130 is a line through which various pieces of data or signals are transmitted.

Although not shown, according to the present embodiment, the digital photographing apparatus 100 may use an exchangeable lens.

According to the present embodiment, the digital photographing apparatus 100 includes both a phase difference AF element and a contrast AF element, thereby constituting a system for combining the advantages of an active AF method and a passive AF method and making up for the disadvantages.

Figure 2:
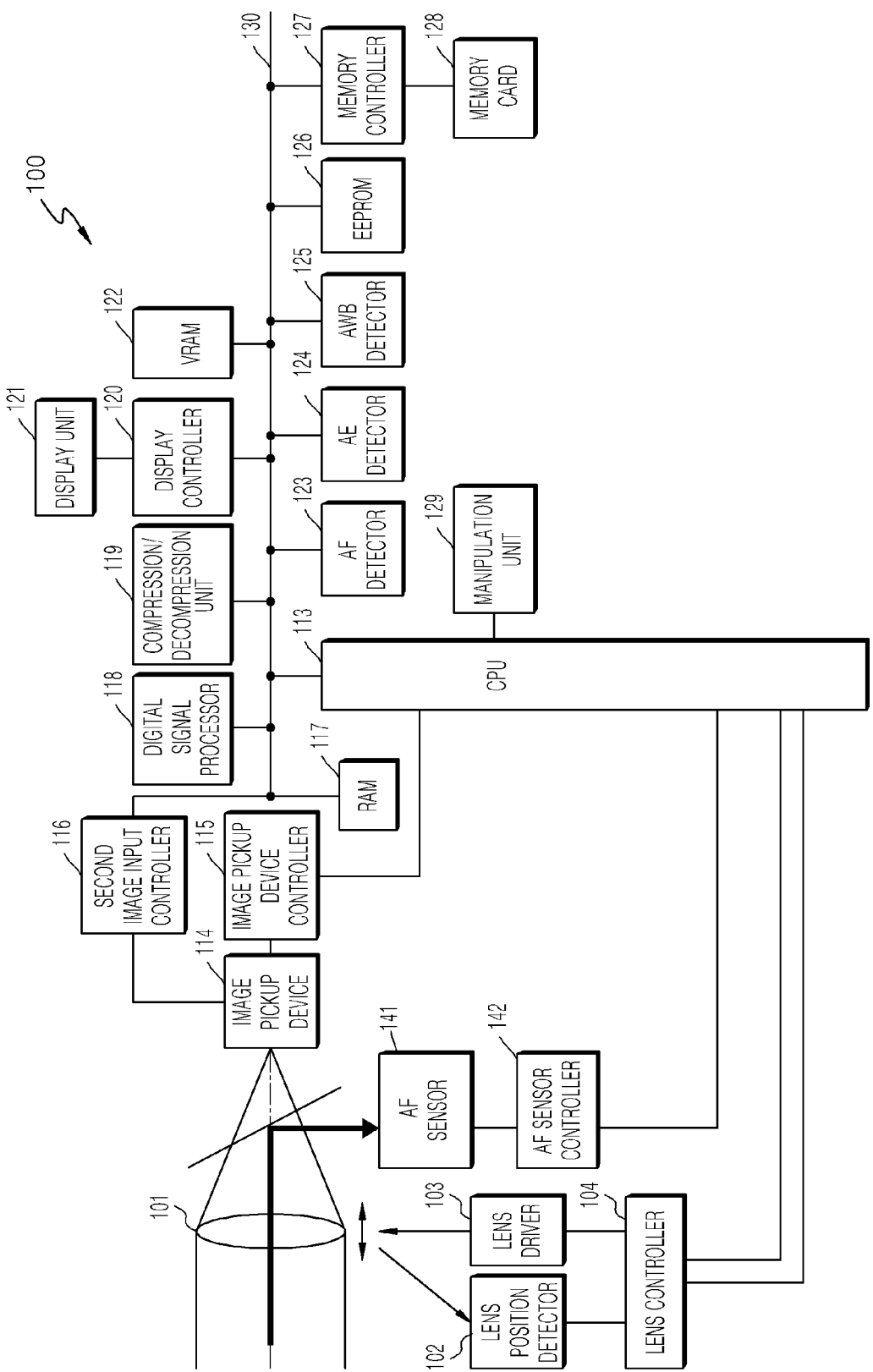
FIG. 2 is a block diagram of a digital photographing apparatus using a TTL passive phase difference AF method, according to an embodiment.

FIG. 2 is a block diagram of a digital photographing apparatus 100 using a TTL passive phase difference AF method, according to an embodiment. An overall structure of the digital photographing apparatus 100 of FIG. 2 is similar to that of the digital photographing apparatus 100 of FIG. 1, and thus, the digital photographing apparatus 100 of FIG. 2 will be described in terms of its differences from the digital photographing apparatus 100 of FIG. 1. In the TTL passive phase difference AF method, predetermined exit pupil regions positioned across an optical axis of an image pickup lens receive light reflected from a plurality of subjects, and focus detection is performed from position information of received images. An AF sensor 141 shown in FIG. 2 receives the images of the plurality of subjects. An AF sensor controller 142 drives the AF sensor 141 or obtains and processes an image of a subject. The AF sensor controller 142 performs the focus detection calculation. Alternatively, although not shown in FIG. 2, the focus detection calculation may be performed by the CPU 113.

Figure 3:
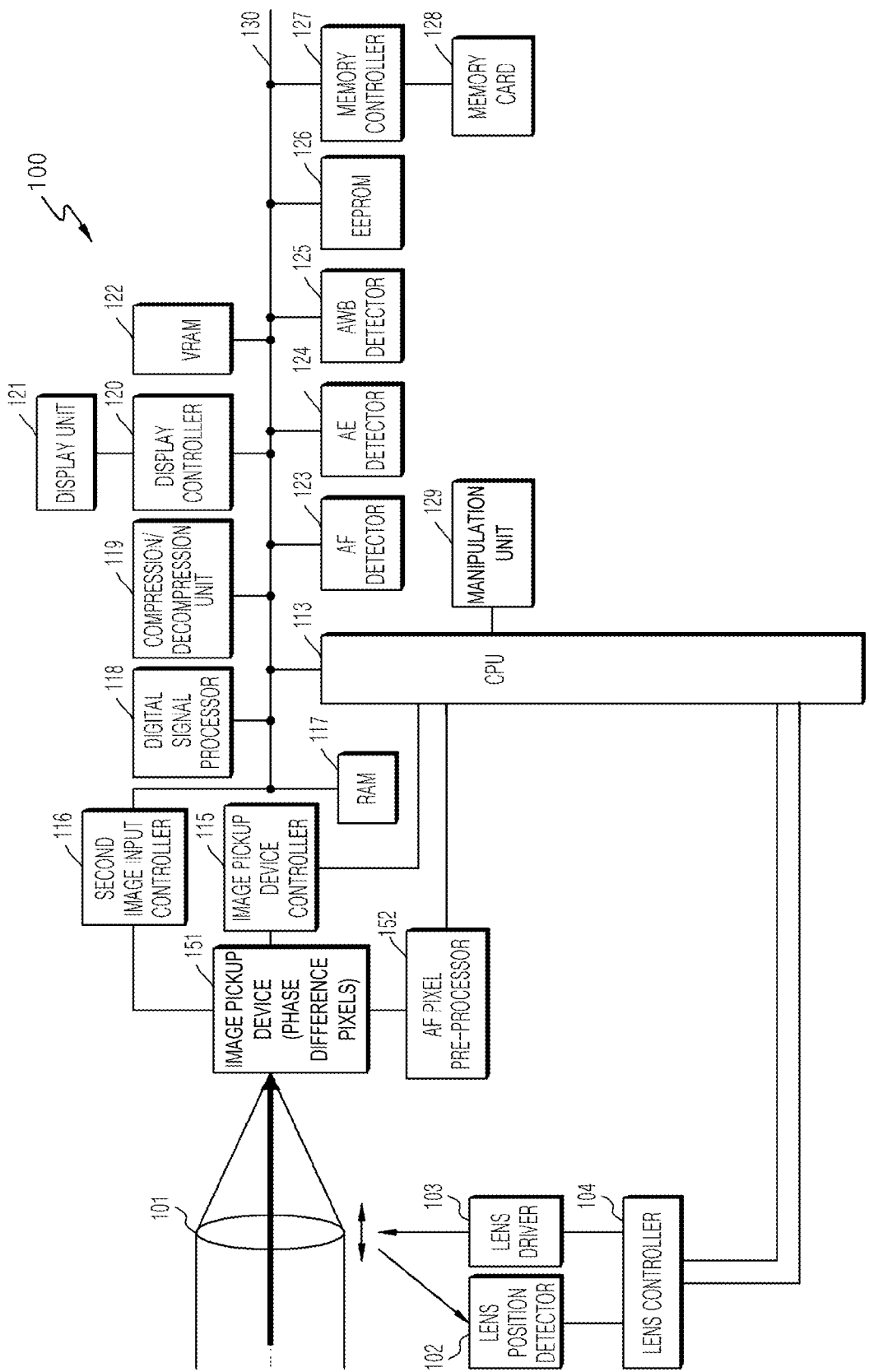
FIG. 3 is a block diagram of a digital photographing apparatus using a TTL image plane phase difference AF method, according to an embodiment.

FIG. 3 is a block diagram of a digital photographing apparatus 100 using a TTL image plane phase difference AF method, according to an embodiment. An overall structure of the digital photographing apparatus 100 of FIG. 3 is similar to that of the digital photographing apparatus 100 of FIG. 1, and thus, the digital photographing apparatus 100 of FIG. 3 will be described in terms of its differences from the digital photographing apparatus 100 of FIG. 1. In the TTL image plane phase difference AF method, phase difference detection pixels are arranged in an image pickup device, and a focus is detected by using phase difference information of a subject image obtained from a plurality of phase difference pixel output streams. That is, in FIG. 3, an image pickup device 151, which includes phase difference pixels formed therein, receives the phase difference pixel output streams. In addition, an AF pixel pre-processor 152 obtains information of the phase difference pixels and performs a calculation on the information. The image plane phase difference AF method is described below in more detail with reference to FIG. 6. Here, although not shown in FIG. 3, the focus detection calculation may also be performed by the CPU 113.

Figure 4:
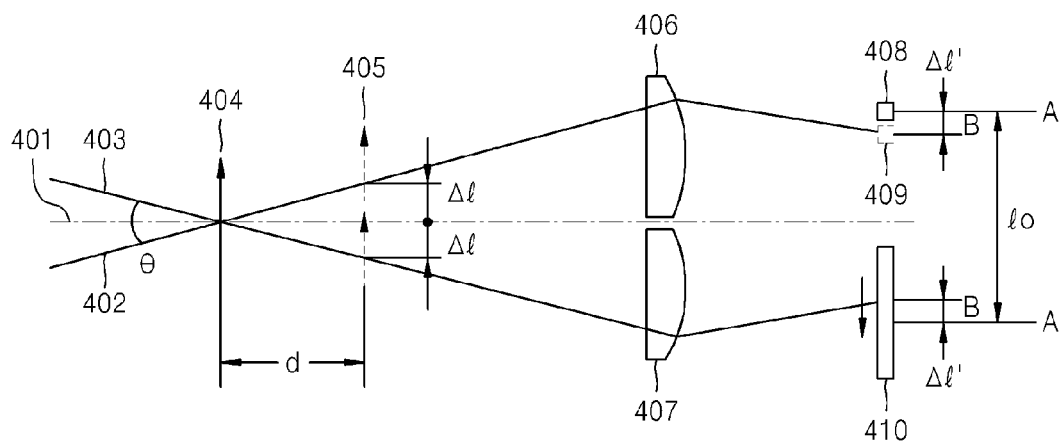
FIG. 4 is a diagram illustrating a method of calculating focus deviation of TTL active phase difference AF, according to an embodiment.

FIG. 4 is a diagram illustrating a method of calculating focus deviation of TTL active phase difference AF, according to an embodiment.

FIG. 4 shows an optical axis 401 of an image pickup lens, a main optical line 402 of a transmitted light flux for AF, a main optical line 403 of a received light flux for AF, a front-focusing upper image plane 404, a upper image plane 405 shared with an image plane during focusing, a light-transmitting lens 406, a receiving lens 407, a transmitting light source 408, a position 409 of an imaginary transmitting light source during front-focusing, and a light-receiving sensor 410. lo denotes an interval between images during focusing, and Δl' denotes a movement degree of an imaging during front-focusing. That is, A denotes a position of an image during focusing, and B denotes a position of an image during front-focusing.

Light is transmitted at a position A (upper) of a side of the transmitting light source 408, and an image is formed at a position A (lower) of a side of the light-receiving sensor 410 during focusing.

In reality, the transmitting light source 408 is positioned at the position A (upper). However, the transmitting light source 408 is viewed to be positioned at the position B on a conjugate plane of an image plane. Thus, a difference d between the image plane 405 shared with the image plane during focusing and the front-focusing upper image plane 404 is a defocus degree, which is a deviation of focus.

Viewed from a point perpendicular to the optical axis 401, an interval between images during focus is lo, and an image moves by as much as Δl'+Δl' during front-focusing. That is, a variation amount of the interval between images is a function of a defocus degree. Accordingly, a defocus degree d may be represented according to a difference in interval between images.

$$d = \frac{\Delta l}{\tan\theta} = \frac{\Delta l'}{\beta\tan\theta} \quad (1)$$

β: reduction ratio, Δl'=Δl'+Δl'

In Equation 1 above, a defocus degree may be obtained by calculating Δl'+Δl'.

Figure 5:
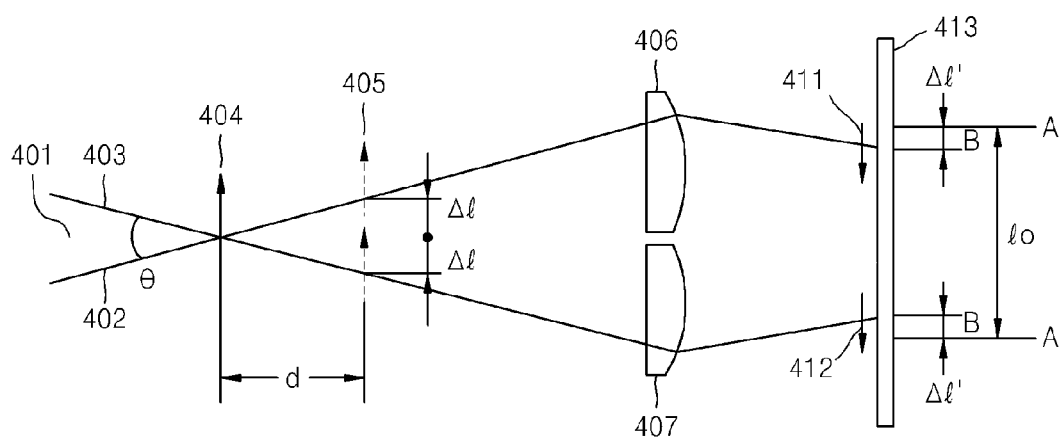
FIG. 5 is a diagram illustrating a focus detecting method using a TTL passive phase difference AF method, according to an embodiment.

FIG. 5 is a diagram illustrating a focus detecting method using a TTL passive phase difference AF method, according to an embodiment. The TTL passive phase difference AF of FIG. 5 is similar to the TTL active phase difference AF of FIG. 4, but is different from the TTL active phase difference AF of FIG. 4 in that the TTL passive phase difference AF of FIG. 5 uses a light-receiving sensor 413 only, but not the transmitting light source 408.

Referring to FIG. 5, light-receiving sensor 413 is divided into a plurality of portions and receives an image of a subject. The divided portions are used as a standard portion 411 and a reference portion 412. An interval between two images received by the standard portion 411 and the reference portion 412 is changed when a focusing position of an image pickup lens is changed. That is, an image on the front-focusing upper image plane 404, which is imaged on the image pickup lens, is divided into a plurality of images on the standard portion 411 and the reference portion 412 by separator lenses (a light-transmitting lens 406, a receiving lens 407) such that an interval lo between the images may be changed. The changing principle is the same as shown in FIG. 4. That is, a variation amount of the interval between images is a function of a defocus degree. Thus, a defocus degree d is represented according to a change in interval between image planes. And, a formula for a defocus degree d is the same as shown in Equation 1.

Figure 6:
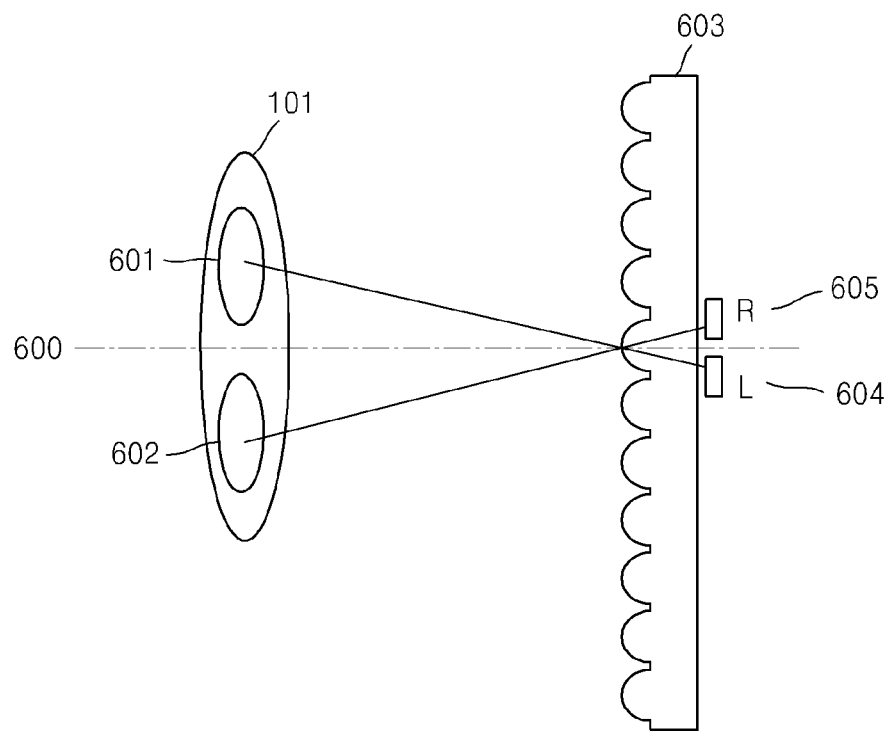
FIG. 6 is a diagram illustrating a focus detecting method using a TTL image plane phase difference AF method, according to an embodiment.

FIG. 6 is a diagram illustrating a focus detecting method using a TTL image plane phase difference AF method, according to an embodiment.

Referring to FIG. 6, subject light transmitted through an image pickup lens is guided to light-receiving pixels R 605 and L 604 through a microlens array 603 provided on an image pickup lens. A mask or opening for limiting an exit pupil region that is incident from the image pickup lens 101 is set on a portion of each of the light-receiving pixels R 605 and L 604. In addition, from among exit pupil regions of the image pickup lens 101, light from an exit pupil region 601 positioned above an optical axis 600 is guided to the light-receiving pixel L 604, and light from an exit pupil region 602 positioned below the optical axis 600 is guided to the light-receiving pixel R 605. That is, a back-projecting light corresponding to a position of the exit pupil regions 601 and 602 through the microlens array 603 is received by the light-receiving pixels R 605 and L 604 through the mask or opening of each of the light-receiving pixels R 605 and L 604, which is referred to as exit pupil separation. Output streams of the pixel which is corresponding to the exit pupil separation is obtained from output light streams in the form of consecutive arrays of the light-receiving pixels R 605 and L 604 according to of the microlens array 603. Here, the two output streams of the pixel have the same shape, but have different positions, that is, different phases. This is because image pickup positions of light fluxes from exit pupil regions from the image pickup lens 101 are different from each other. Thus, during focusing, images are formed at the same position. Based on this principle, a focus is detected.

Although the focus detecting method using a TTL image plane phase difference AF method is a phase difference AF method, a reflective mirror is not required, thereby reducing the size of a digital photographing apparatus.

Figure 7A:
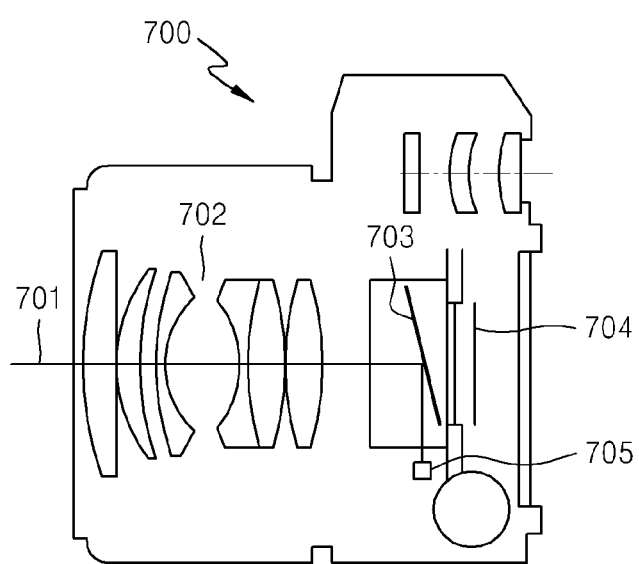
FIGS. 7A to 7C are diagrams illustrating digital photographing apparatuses using a TTL active phase difference AF method, according to various embodiments.
Figure 7B:
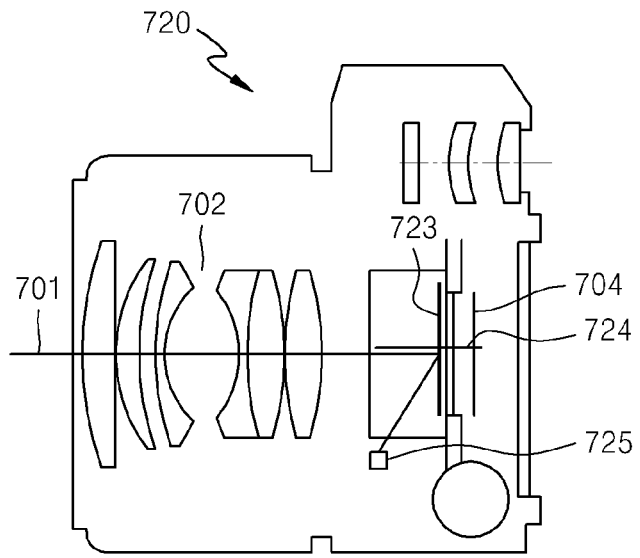
Figure 7C:
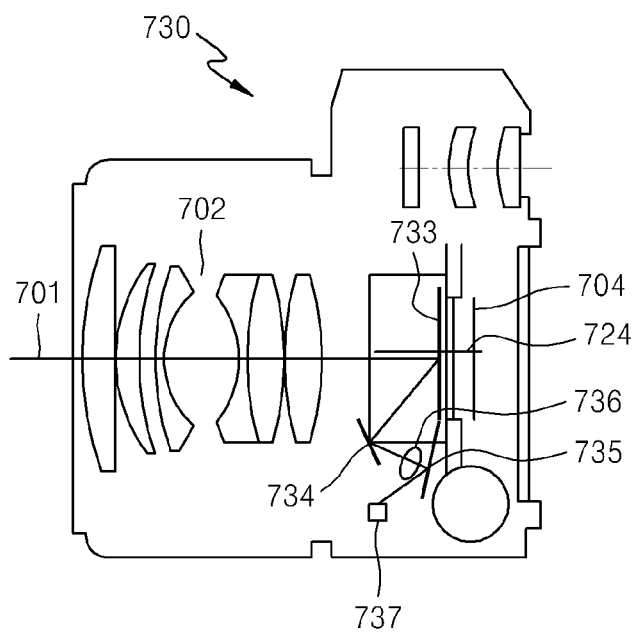

FIGS. 7A to 7C are diagrams illustrating digital photographing apparatuses 700, 720, and 730 using a TTL active phase difference AF method, according to various embodiments. Thus, only elements required for describing the digital photographing apparatuses 700, 720, and 730 are shown in FIGS. 7A to 7C.

Referring to FIG. 7A, the digital photographing apparatus 700 includes an image pickup lens 702, an optical film 703, an image pickup device 704, and a light transmitting and receiving unit 705. A reference numeral 701 denotes an optical axis of the image pickup lens 702. The optical film 703 is installed to be inclined with respect to the optical axis 701. The optical film 703 may be a thin film and may be a holographic optical element (HOE).

With regard to a path of light incident on the image pickup lens 702, the light is transmitted through the image pickup lens 702, is incident on the optical film 703 in a direction parallel to the optical axis, and then, is reflected in a vertically downward direction. The reflected light is received by a light receiver, for example, the light transmitting and receiving unit 705, installed at a position for receiving the light.

When an incident angle of light is equal to a reflective angle of the light, an HOE, a diffractive optical element (DOE), or a pellicle mirror may be used as the optical film 703.

Referring to FIG. 7B, the digital photographing apparatus 720 includes the image pickup lens 702, an optical film 723, and a light transmitting and receiving unit 725. A reference numeral 724 denotes a line perpendicular to the optical film 723. According to the present embodiment, the optical film 723 is installed to be about perpendicular to the optical axis 701 and not as inclined as the optical film 703 in FIG. 7A.

With regard to a path of light incident on the image pickup lens 702, the light is transmitted through the image pickup lens 702, is incident on the optical film 723 in a direction parallel to the optical axis, and then, is reflected at an angle toward the image pickup lens 702 instead of in a vertically downward direction. Thus, a light receiver, for example, the light transmitting and receiving unit 725, is provided to be inclined toward the image pickup lens 702, as compared with the light transmitting and receiving unit 705 in FIG. 7A.

Since an incident angle of light is different from a reflective angle, an HOE may be used as the optical film 723. In addition, since the optical film 723 is vertically provided, an internal space of the digital photographing apparatus 720 may be ensured, thereby increasing a freedom degree of lens design. In addition, the quality of a captured image may be increased.

Referring to FIG. 7C, the digital photographing apparatus 730 includes the image pickup lens 702, an optical film 733, a first sub-mirror 734, a second sub-mirror 735, a light transmitting and receiving unit 737, and a condenser lens 736.

According to the present embodiment, the digital photographing apparatus 730 further includes the first and second sub-mirrors 734 and 735. When the digital photographing apparatus 730 of FIG. 7C is compared with the digital photographing apparatus of FIG. 7B, a reflective angle of the optical film 733 may be limited to be small. However, the condenser lens 736 is used due to a long optical path.

Like in FIG. 7B, since an incident angle of light is different from a reflective angle, an HOE may be used as the optical film 733. Since the optical film 733 is vertically provided, an internal space of the digital photographing apparatus 730 may be ensured, thereby increasing a freedom degree of lens design. In addition, the quality of a captured image may be increased.

FIGS. 8A to 8D are diagrams illustrating digital photographing apparatuses using a TTL passive phase difference AF method, according to various embodiments. General views of the digital photographing apparatuses will not be given here.

Figure 8A:
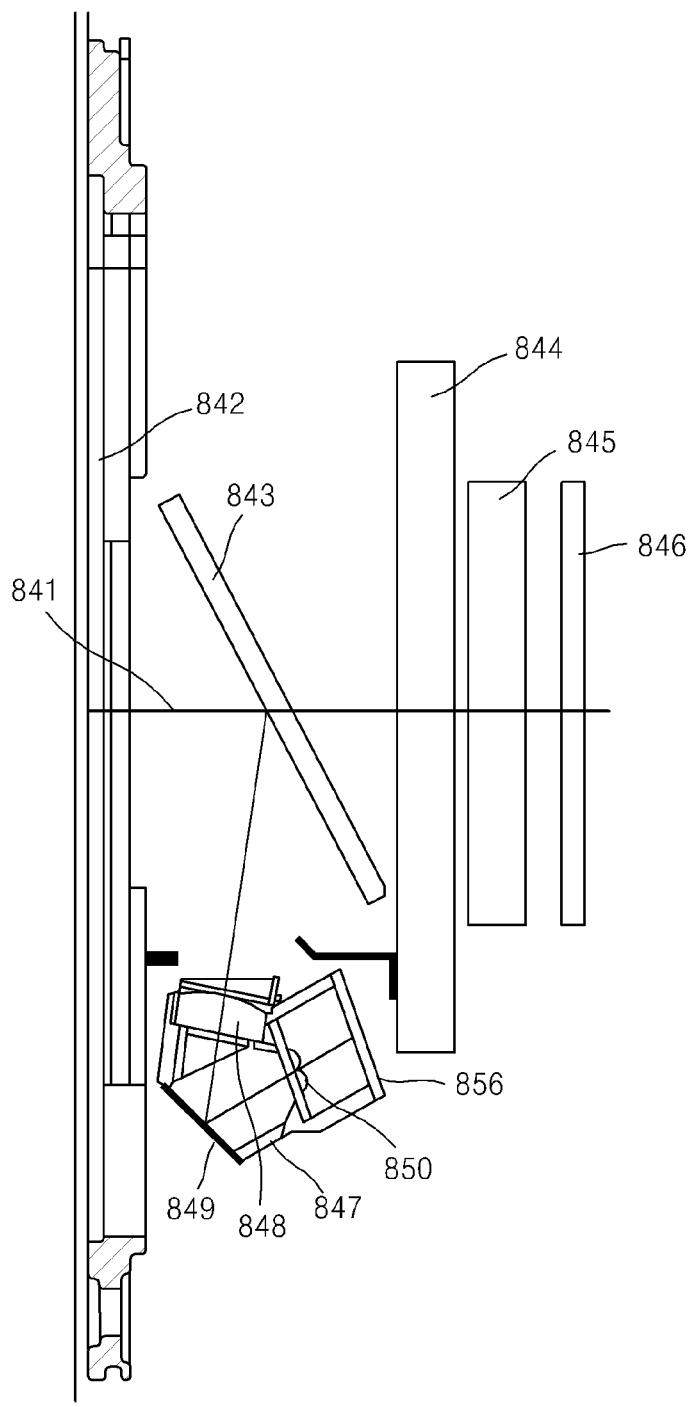
FIGS. 8A to 8D are diagrams illustrating digital photographing apparatuses using a TTL passive phase difference AF method, according to various embodiments.

FIG. 8A illustrates an optical axis 841, a body mount 842 of the digital photographing apparatus, an optical film 843, a shutter 844, an optical low-pass filter 845, an image pickup device 846, an AF module 847, a condenser lens 848, a mirror 849, a separator lens 850, and an AF sensor 856. Light transmitted through a predetermined exit pupil region of an image pickup lens is separated by the optical film 843, which may include a pellicle mirror or an HOE. That is, the light is separated to be transmitted to the image pickup device 846 and the AF sensor 856. Here, the optical film 843 (or a mirror) is a fixed type. In addition, if an internal space of the digital photographing apparatus is large, a pellicle mirror may be used. If the internal space of the digital photographing apparatus is small, an HOE may be used.

Figure 8B:
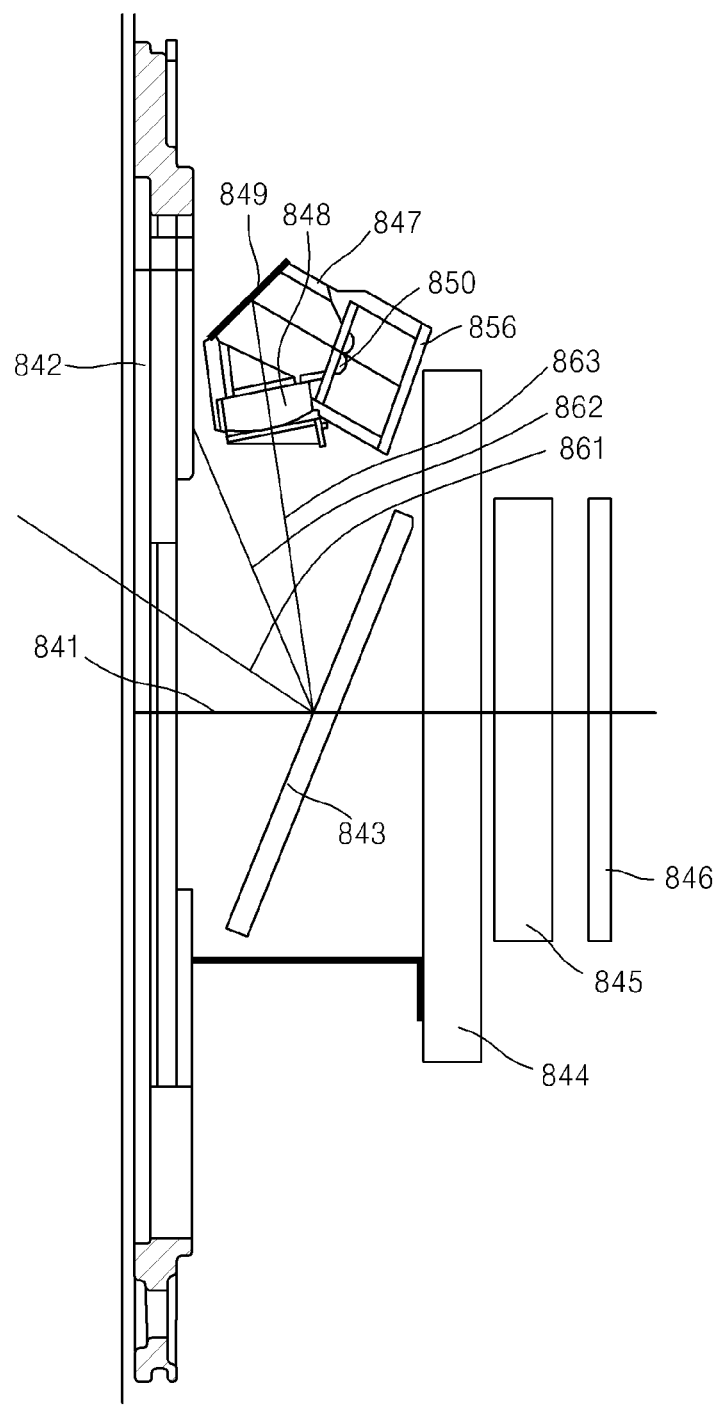

FIG. 8B illustrates a case where the AF module 847 is disposed in the digital photographing apparatus. The optical film 843 reflects light transmitted through a predetermined exit pupil region of an image pickup lens at a greater angle than an angle of regular reflection by using an HOE. Accordingly, light of a subject is guided to the AF module 847 along an optical path 863 at a greater angle than an optical path corresponding to a reflection direction 862 from the optical axis 841, with respect to a vertical direction 861 of the optical film 843.

Figure 8C:
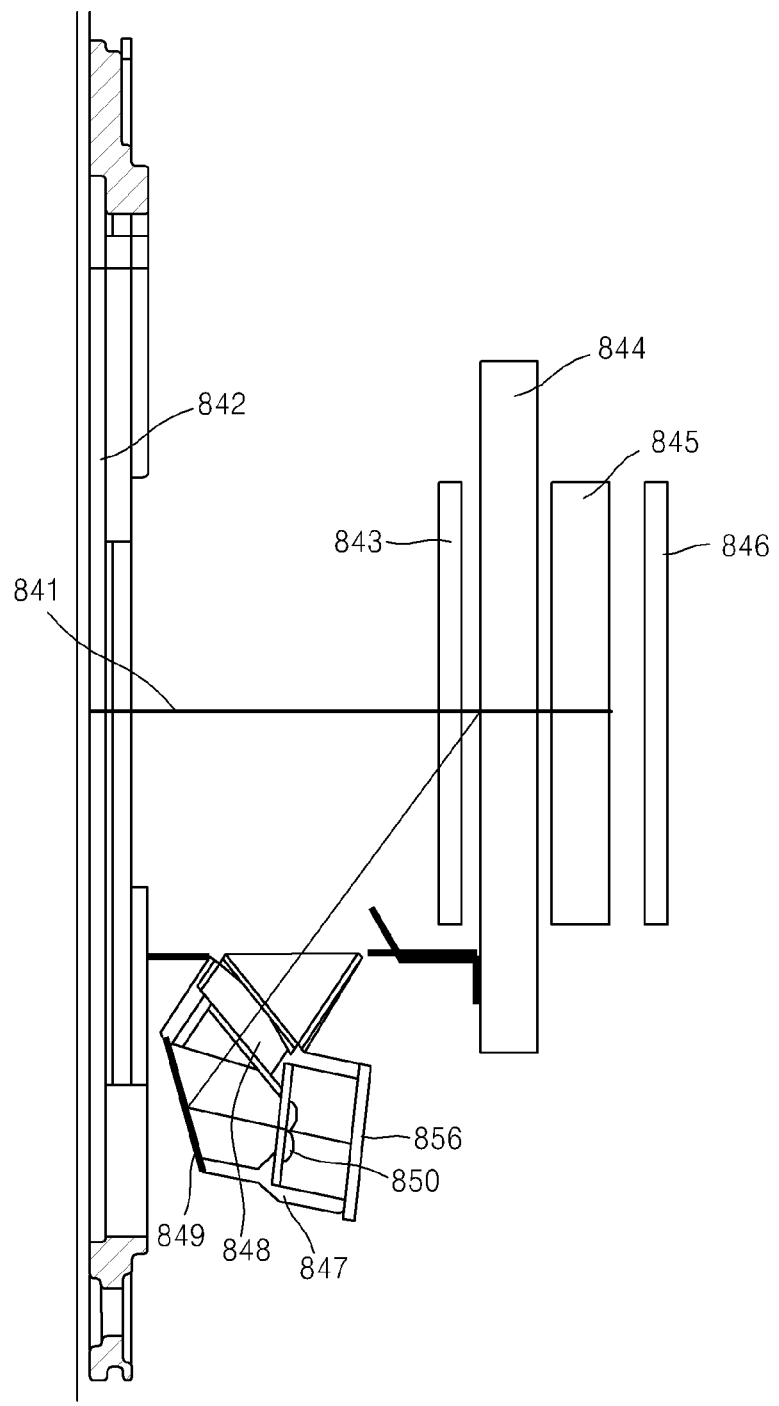

FIG. 8C illustrates a case where the optical film 843, which is an HOE, is disposed in parallel to the image pickup device 846. Like in FIG. 7B, the image quality performance of the digital photographing apparatus may be increased.

Figure 8D:
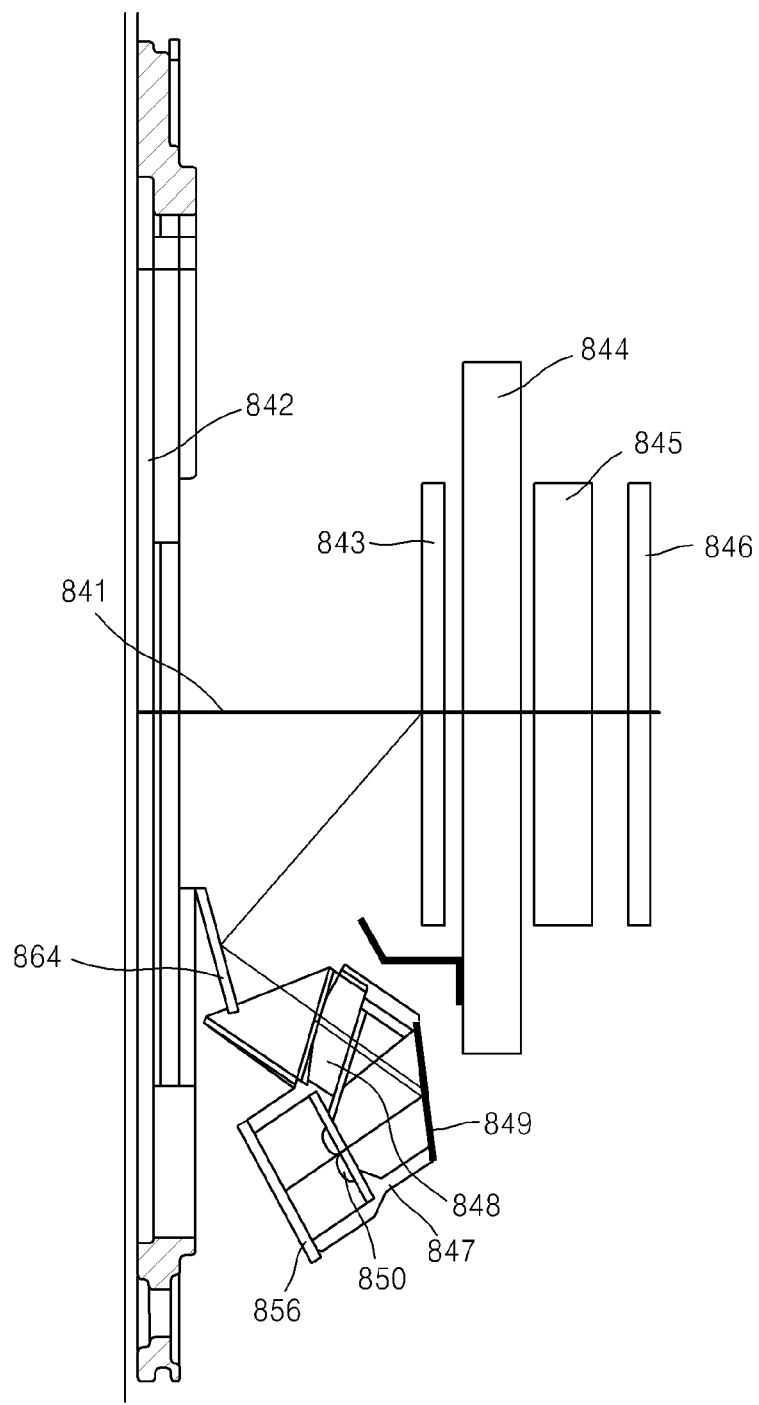

FIG. 8D illustrates a case where a second mirror 864 is disposed in front of the AF module 847. The second mirror 864 may be installed in an internal space in a digital photographing apparatus even if the internal space is small.

Figure 9A:
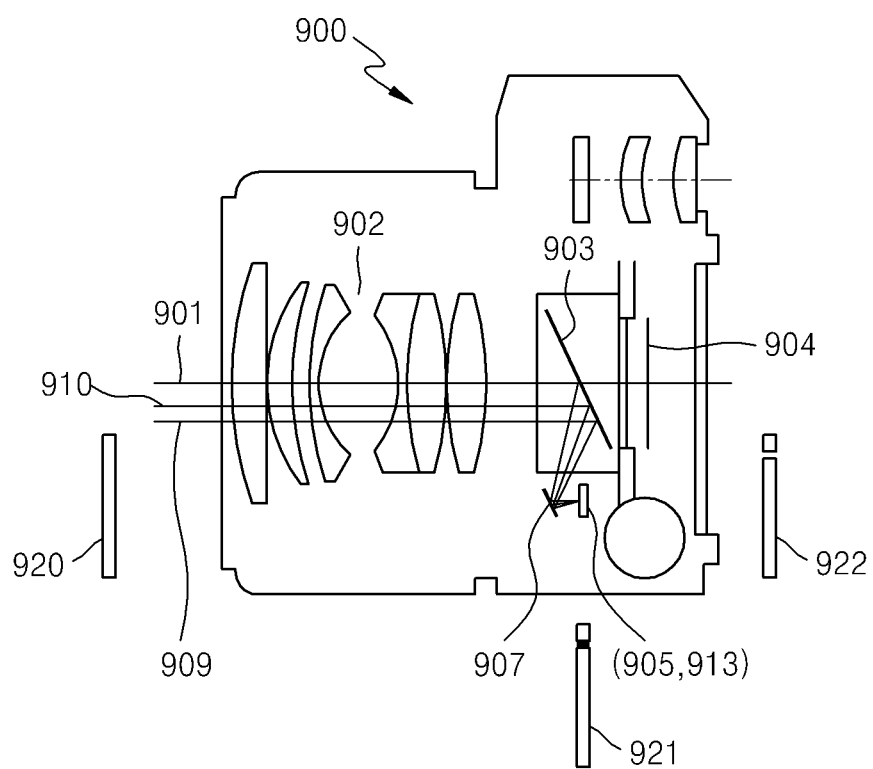
FIG. 9A is a structural diagram of a digital photographing apparatus using a TTL active AF method, according to an embodiment.
Figure 10:
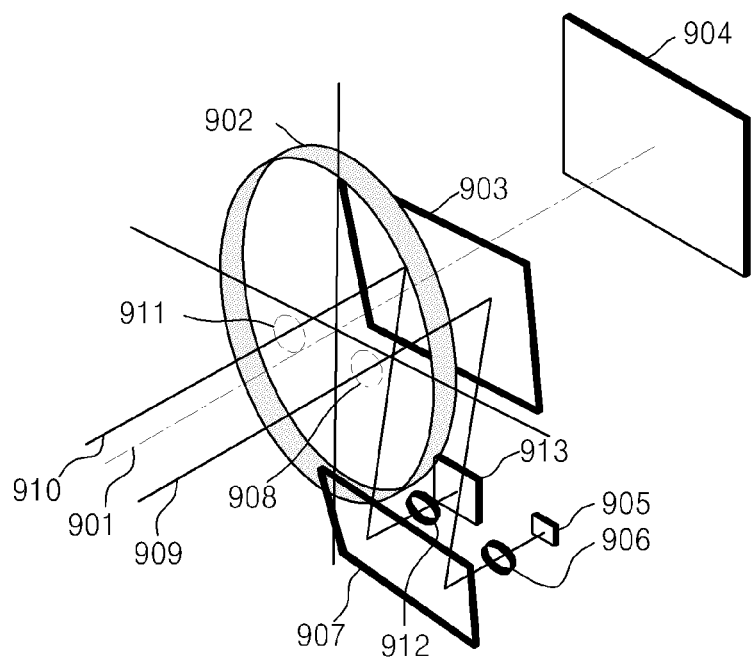
FIG. 10 is a diagram illustrating the TTL active AF method of the digital photographing apparatus of FIG. 9A, according to an embodiment.

FIG. 9A is a structural diagram of a digital photographing apparatus 900 using a TTL active AF method, according to an embodiment. FIG. 10 is a diagram illustrating the TTL active AF method of the digital photographing apparatus 900 of FIG. 9A, according to an embodiment.

Referring to FIGS. 9A and 10, the digital photographing apparatus 900 includes an image pickup lens 902, an optical film 903, an image pickup device 904, a light-transmitting unit 905, a light-receiving unit 913, a reflective mirror 907, a light-transmitting lens 906, a light-receiving lens 912, and so on. A reference numeral 901 denotes an optical axis of the image pickup lens 902, a reference numeral 909 denotes an optical path used by the light-transmitting unit 905, and a reference numeral 910 denotes an optical path used by the light-receiving unit 913. In this case, the light-transmitting lens 906 and the light-receiving lens 912 limit an F number of a transmitting light flux and a receiving light flux to a predetermined value.

The light-transmitting unit 905 generates light for AF, for example, light from a light-emitting diode (LED). The light-transmitting unit 905 generates light for AF, which is light having a wavelength of 700 nm only.

The light generated by the light-transmitting unit 905 is transmitted through the light-transmitting lens 906, is reflected by the reflective mirror 907 and the optical film 903, and is emitted out of the digital photographing apparatus 900 through a first exit pupil region 908 positioned within a range of a predetermined F number of the image pickup lens 902. In this case, the optical film 903 is designed to reflect only light having the same wavelength as a wavelength of light emitted by the light-transmitting unit 905. According to the present embodiment, an HOE, a pellicle mirror, or the like may be used as the optical film 903.

The light emitted by the digital photographing apparatus 900 is reflected by the subject, and the reflected light is transmitted through a second exit pupil region 911 positioned in a range of a predetermined F number of the image pickup lens 902 and is incident on the digital photographing apparatus 900. In this case, the incident light is generated due to reflection of external visible light and includes light having all visible wavelength ranges. However, the optical film 903 reflects light for AF, which is light having a wavelength of 700 nm only.

The light having a wavelength of 700 nm, which is reflected by the optical film 903 and the reflective mirror 907, is transmitted to the light-receiving unit 913, and is received by the light-receiving unit 913. An area sensor, a position sensitive (PSD) sensor, a line sensor, or the like may be used as the light-receiving unit 913.

Emitted light and incident light are transmitted through a region positioned below an optical axis. That is, the first exit pupil region 908 and the second exit pupil region 911 are positioned in a lower semicircular region of the image pickup lens 902.

Figure 9B:
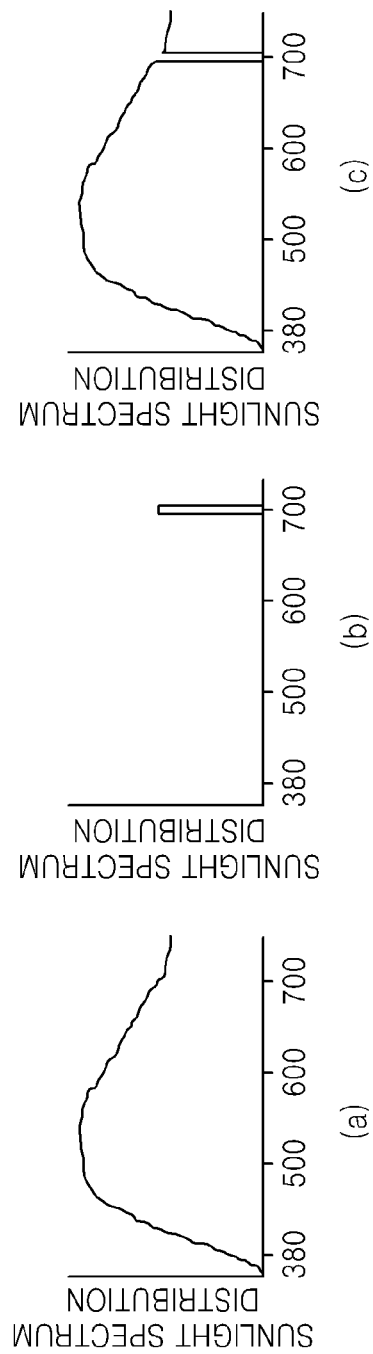
FIG. 9B illustrates graphs of spectrum distribution of sunlight according to wavelengths, according to an embodiment.

As described above, the TTL active AF method may be performed. In this case, the wavelength distribution of light at each region is described below. FIG. 9B illustrates graphs of spectrum distribution of sunlight according to wavelengths, according to an embodiment.

A reference numeral 920 of FIG. 9A denotes the wavelength distribution of external light. Since the external light includes reflected light of sunlight, the external light includes light of all visible wavelengths, which is shown in detail in spectrum distribution graph (a) of FIG. 9B or 920 of FIG. 9A. In FIG. 9B, a horizontal axis indicates a wavelength, and a vertical axis indicates a spectrum distribution (intensity of solar radiation) of sunlight sensed by humans.

A reference numeral 921 of FIG. 9A denotes the wavelength distribution of light reflected by the optical film 903 or light incident on the light-receiving unit 913. Since only light having a predetermined wavelength used for AF is reflected by the optical film 903, only the light having the predetermined wavelength is distributed, as shown in detail in spectrum distribution graph (b) of FIG. 9B or 921 of FIG. 9A. For example, in graph (b) of FIG. 9B, light having a wavelength of 700 nm may be spectrum-distributed. In addition, the light is reflected at a diffraction efficiency of 95% or more.

A reference numeral 922 of FIG. 9A denotes the wavelength distribution of light incident on the image pickup device 904. In general, a digital photographing apparatus is designed such that the light is distributed close to distribution of light which humans sense. In addition, the image pickup device 904 contains light having all visible wavelength range except for a wavelength of light reflected by the optical film 903, as shown in detail in spectrum distribution graph (c) of FIG. 9B or 922 of FIG. 9A. It may be configured such that only light having a wavelength of, for example, 700 nm, is not captured. In addition, an infrared filter is disposed in front of an image sensor. The image sensor captures light having a wavelength of 700 nm or more and scans light having a wavelength less than 700 nm.

As such, light having a predetermined wavelength is captured by the image pickup device 904, which does not affect an image, thereby preventing a reduction in image quality.

Figure 11A:
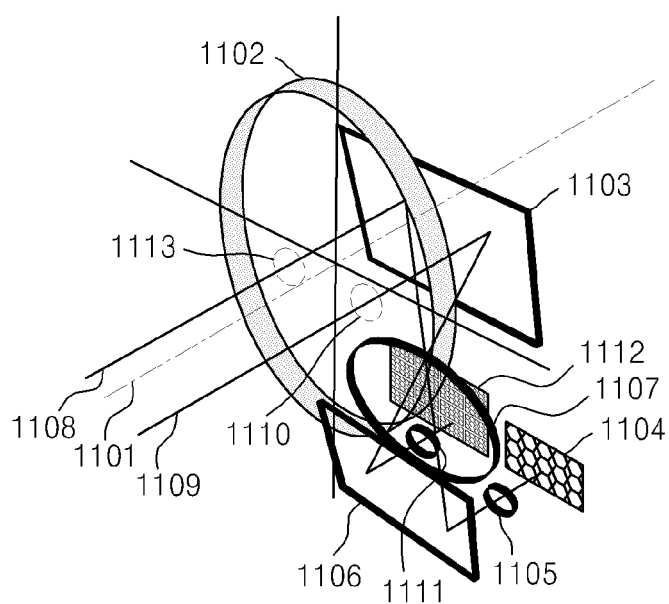
FIGS. 11A and 11B are diagrams illustrating a focus detecting apparatus, according to an embodiment.
Figure 11B:
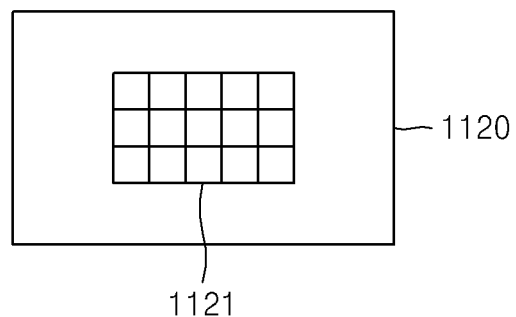

FIGS. 11A and 11B are diagrams illustrating a focus detecting apparatus, according to an embodiment. The focus detecting apparatus includes an image pickup lens 1102 and a reflective mirror 1106. A reference numeral 1101 denotes an optical axis, a reference numeral 1109 denotes an optical path used by a plurality of light-transmitting units 1104, and a reference numeral 1108 denotes an optical path used by the light-receiving unit 1112. A first exit pupil region 1110 and a second exit pupil region 1113 are positioned in a lower semicircular region of the image pickup lens 1102. Hereinafter, the focus detecting apparatus of FIGS. 11A and 11B will be described below in terms of its differences from the focus detecting apparatus of the digital photographing apparatus 900 of FIGS. 9A and 10.

According to the present embodiment, a plurality of light-transmitting units 1104 is used such that light for AF is generated at a plurality of points. A light-receiving unit 1112 may be a light-receiving sensor that is split in time series.

A light-transmitting lens 1105 and a light-receiving lens 1111 may constitute a downscale optical system, for example, a downscale optical system having a magnification of ⅓. In addition, an equivalent plane of an image pickup surface plane of an image pickup device, that is, a conjugate plane of the image pickup plane, is positioned on an optical path between the light-transmitting lens 1105 and an optical film 1103. In addition, in order to define an exit pupil region, a condenser lens 1107 is provided behind the conjugate plane. The reduction ratio may be designed by using the condenser lens 1107. In addition, the reduction ratio may be changed according to a degree of transmitted light.

According to the present embodiment, the light-receiving unit 1112 is divided in time series, and light is reflected by 15 portions of the light-transmitting units 1104 so as to detect a position of the reflected light. However, the invention is not limited thereto. For example, each of the 15 portions of the light-transmitting units 1104 may simultaneously generate light rays having different wavelengths, and may simultaneously receive light rays reflected by a subject and having different wavelengths so as to detect a position of the reflected light.

In addition, according to the present embodiment, since 15 light rays for AF are generated, an area sensor is used as the light-receiving unit 1112. In addition, the light-receiving unit 1112 receives the reflected light rays, which are generated by the light-transmitting units 1104, at a time difference so as to detect positions of the reflected light rays.

FIG. 11B illustrates positions of a view finder 1120, on which AF is performed, according to an embodiment. A reference numeral 1121 corresponds to a light-transmitting unit 1104. That is, AF is performed on positions of 15 areas of the reference numeral 1121.

Figure 12:
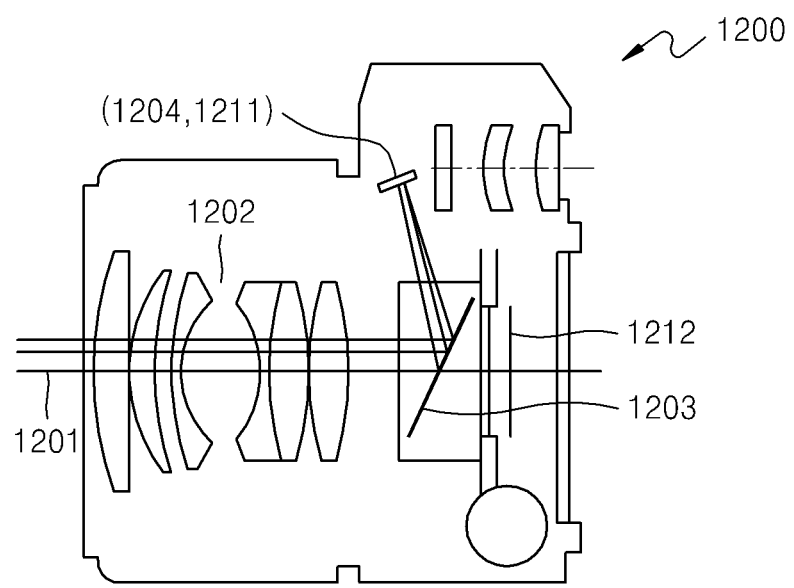
FIG. 12 is a structural diagram of a digital photographing apparatus, according to another embodiment.
Figure 13:
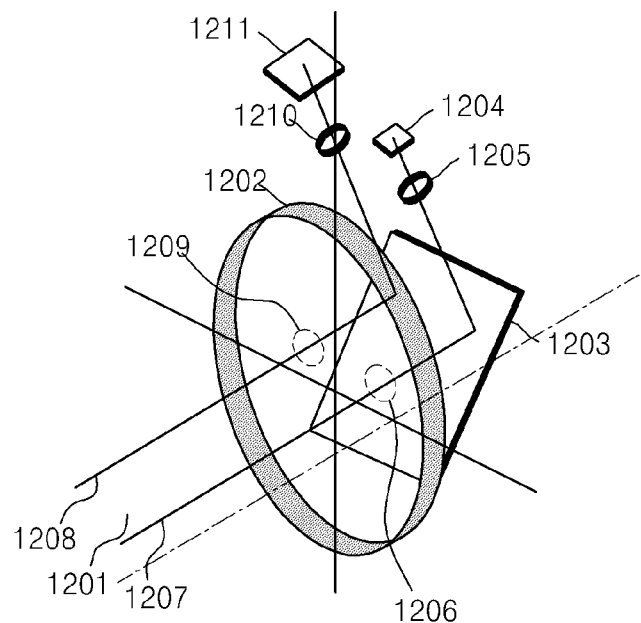
FIG. 13 is a diagram of a focus detecting apparatus of the digital photographing apparatus of FIG. 12.

FIG. 12 is a structural diagram of a digital photographing apparatus 1200, according to another embodiment. FIG. 13 is a diagram of a focus detecting apparatus of the digital photographing apparatus 1200 of FIG. 12.

With reference to FIGS. 12 and 13, the focus detecting apparatus 1200 is described in terms of its differences from the focus detecting apparatus shown in FIG. 9A. For example, the focus detecting apparatus 1200 includes an optical film 1203, an image pickup device 1212, a light-transmitting unit 1204, a light-receiving unit 1211, a light-transmitting lens 1205, a light-receiving lens 1210, and so on. A reference numeral 1201 denotes an optical axis, a reference numeral 1207 denotes an optical path used by the light-transmitting unit 1204, and a reference numeral 1208 denotes an optical path used by the light-receiving unit 1211. Optical paths of emitted light and incident light are through a region positioned above an optical axis. That is, both a first exit pupil region 1206 and a second exit pupil region 1209 are positioned in an upper semicircular region of an image pickup lens 1202.

Figure 14A:
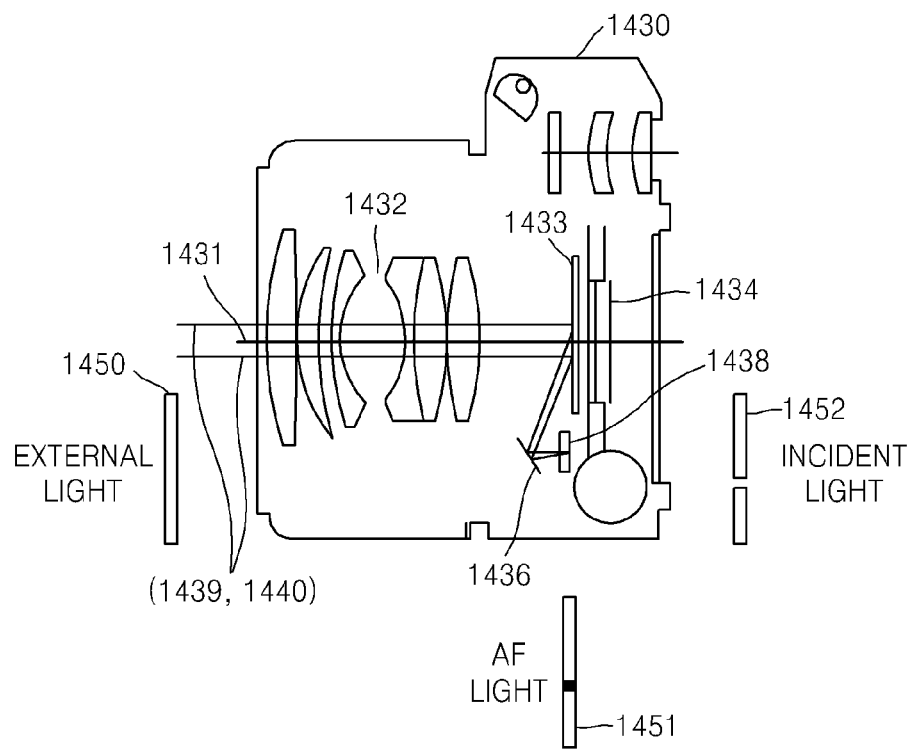
FIGS. 14A and 15 are diagrams illustrating a structure of a digital photographing apparatus using a TTL passive phase difference AF method, according to an embodiment.
Figure 15:
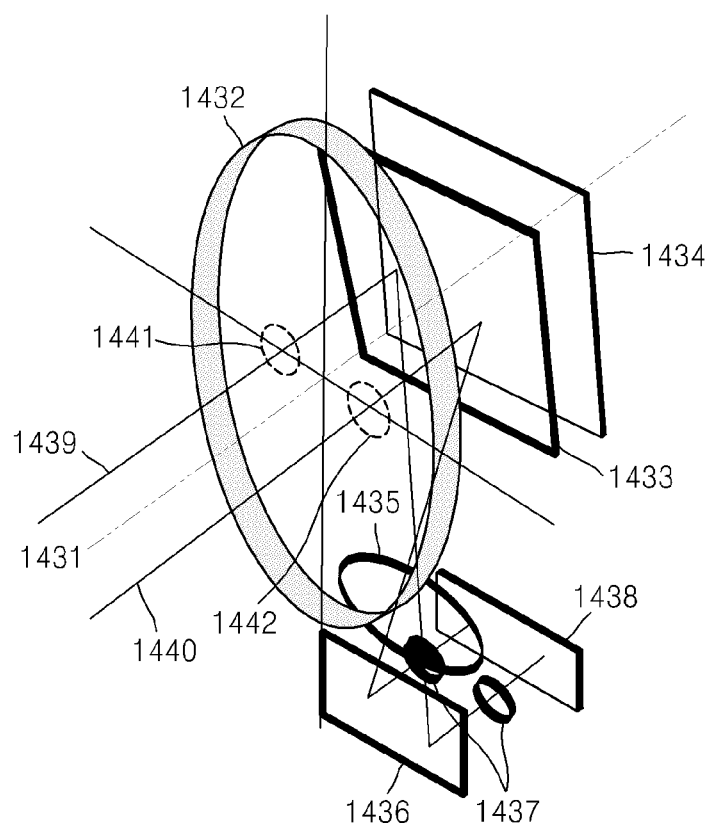

FIGS. 14A and 15 are diagrams illustrating a structure of a digital photographing apparatus 1430 using a TTL passive phase difference AF method, according to an embodiment.

Referring to FIGS. 14A and 15, the digital photographing apparatus 1430 includes an image pickup lens 1432, an optical film 1433, an image pickup device 1434, an AF light-receiving unit 1438, a reflective mirror 1436, a condenser lens 1435, a separator lens 1437, and so on. A reference numeral 1431 denotes an optical axis of the image pickup lens 1432. Reference numerals 1441 and 1442 denote exit pupil regions used for phase difference detection. Reference numerals 1439 and 1440 denote central optical paths used for phase difference detection. In this case, the condenser lens 1435 and the separator lens 1437 limit an F number of a receiving light flux.

The AF light-receiving unit 1438 determines a wavelength used for phase difference detection via the optical film 1433. For example, the AF light-receiving unit 1438 may be designed to use light having a wavelength around an e-line (546 nm). In addition, a wavelength center, a wavelength width, use of a plurality of wavelengths, and the like may be determined in terms of design.

An HOE, a pellicle mirror, or the like may be used as the optical film 1433 such that the optical film 1433 may reflect only light having a predetermined wavelength of a subject. For example, in order to obtain a vertical arrangement of a digital photographing apparatus 1430 of FIG. 14A, an HOE may be used.

Light reflected by the optical film 1433 and the reflective mirror 1436 is transmitted through the separator lens 1437 and is detected by the AF light-receiving unit 1438. Here, a line sensor or an area sensor may be used as the AF light-receiving unit 1438.

Figure 14B:
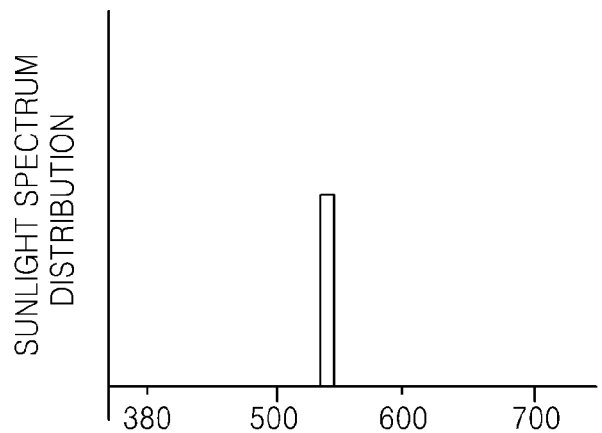
FIG. 14B is a graph of spectrum distribution of sunlight according to a wavelength, according to an embodiment.

In FIG. 14A, a reference numeral 1450 denotes the wavelength distribution of external light. A reference numeral 1451 denotes the wavelength distribution of light reflected by the optical film 1433 and light incident on the light-receiving unit 1438. Since the optical film 1433 reflects only the light used for AF, only the light having the predetermined wavelength is distributed. The wavelength distribution denoted by reference numeral 1451 is shown in detail in FIG. 14B. For example, FIG. 14B is a spectrum distribution diagram in which light has a wavelength of around 546 nm. In FIG. 14A, a reference numeral 1452 denotes the wavelength distribution of light incident on an image pickup device 1434.

Figure 16:
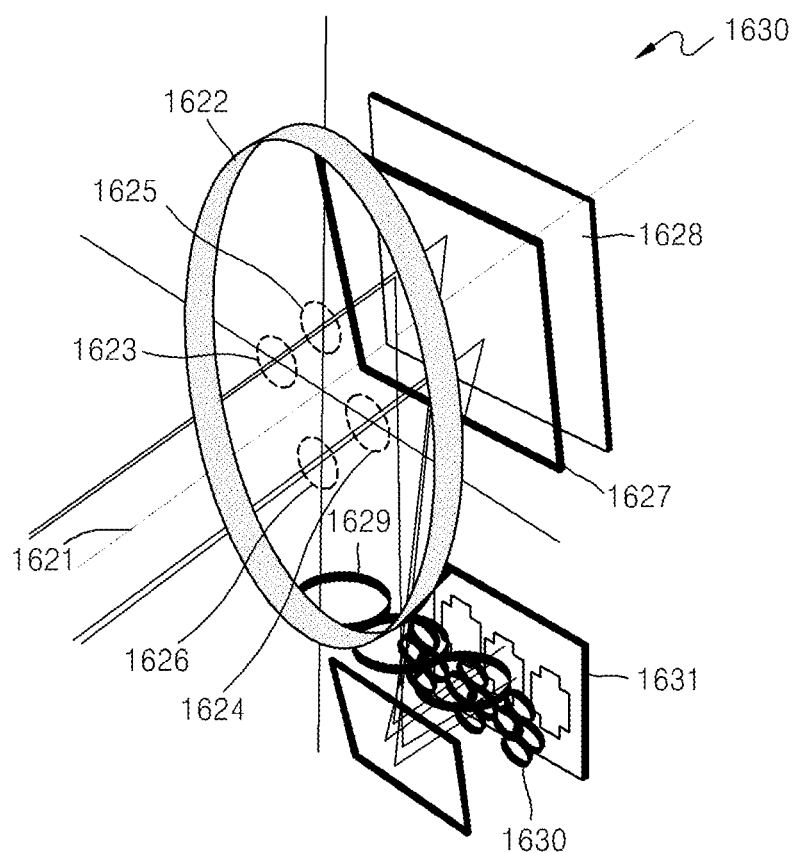
FIG. 16 is a structural diagram of a digital photographing apparatus including a device for performing a TTL passive phase difference AF method, according to an embodiment.

FIG. 16 is a structural diagram of a focus detecting apparatus of a digital photographing apparatus 1630 including a device for performing a TTL passive phase difference AF method, according to an embodiment. Hereinafter, the focus detecting apparatus of the digital photographing apparatus 1630 is described in terms of its differences from a focus detecting apparatus of the digital photographing apparatus 1430 of FIG. 15. For example, the focus detecting apparatus of digital photographing apparatus 1630 may include an image pickup device 1628, an image pickup lens 1622. The reference number 1621 denotes an optical axis.

Referring to FIG. 16, AF is 45-point AF, and 27-point AF of the 45-point AF is phase difference AF that is capable of detecting contrast having vertical and horizontal distribution of a cross type. Thus, an AF line sensor 1631 is divided into 3 blocks so as to form 5 blocks having 3 vertical lines and 3 blocks having 3 horizontal lines. A light flux used in the AF line sensor 1631 is a light flux from a predetermined exit pupil region of an image pickup lens 1622. A contrast detection in the horizontal direction uses a light flux transmitted through exit pupil regions 1623 and 1624, and a contrast detection in the vertical direction uses a light flux transmitted through exit pupil regions 1625 and 1626. A condenser lens 1629 is divided into 3 portions. Four separator lens 1630 are disposed with respect to four cross-shaped portions. In addition, an optical film 1627 is disposed as illustrated in FIG. 16.

Figure 17:
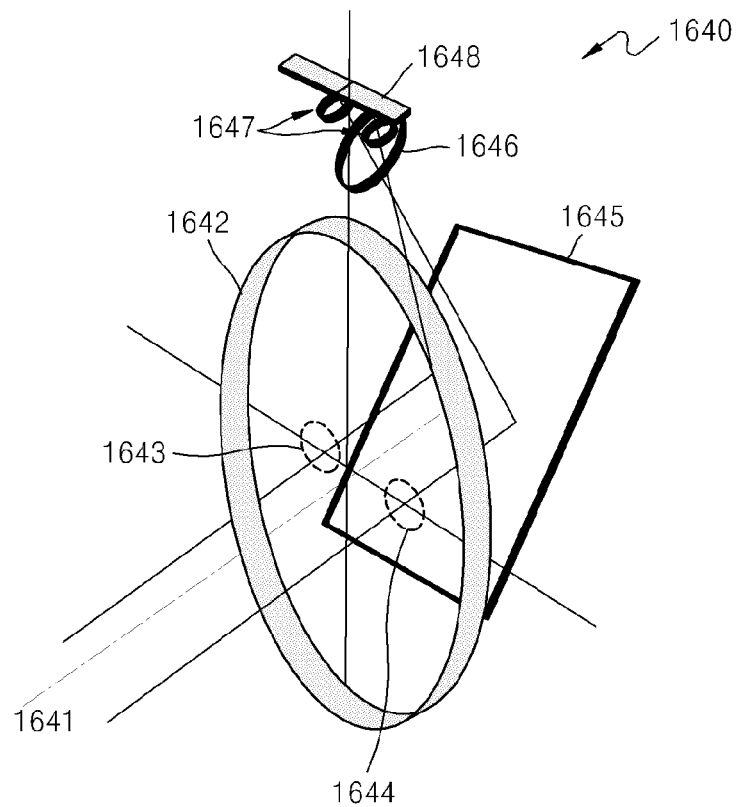
FIG. 17 is a structural diagram of a digital photographing apparatus using a TTL passive phase difference AF method, according to an embodiment.

FIG. 17 is a structural diagram of the digital photographing apparatus 1640 using a TTL passive phase difference AF method, according to an embodiment.

Referring to FIG. 17, an image pickup lens 1642, an AF line sensor 1648, a separator lens 1647, and a condenser lens 1646 are arranged in the digital photographing apparatus 1640. Accordingly, an optical film 1645 is disposed so as to reflect light upward. Furthermore, Exit pupil regions 1643 and 1644 are disposed on the image pickup lens 1642. Reference numeral 1641 denotes an optical axis.

Figure 18:
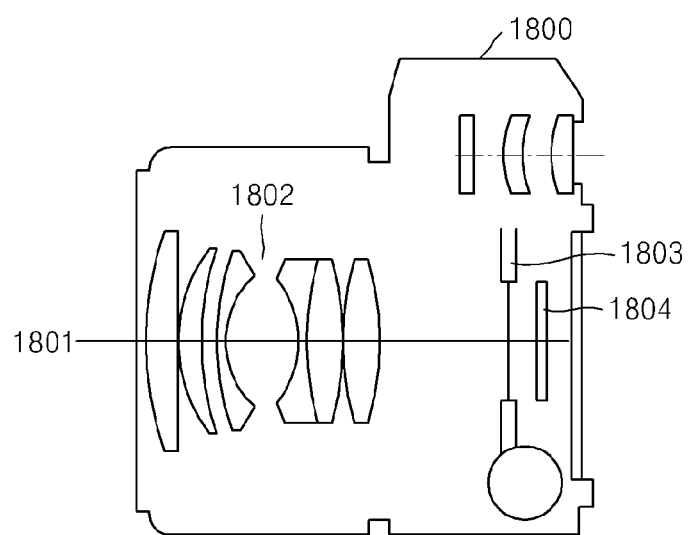
FIG. 18 is a structural diagram of a digital photographing apparatus using a TTL image plane phase difference detecting AF method, according to an embodiment.

FIG. 18 is a structural diagram of a digital photographing apparatus 1800 using a TTL image plane phase difference detecting AF method, according to an embodiment. The digital photographing apparatus 1800 includes an image pickup lens 1802. Reference numeral 1801 denotes an optical axis. The digital photographing apparatus 1800 forms phase difference pixels on an image pickup plane and detects a focus by performing phase difference detection on the image pickup plane. The digital photographing apparatus 1800 of FIG. 18 is different from the digital photographing apparatuses 900 and 1430 of FIGS. 9A and 14A in that the digital photographing apparatus 1800 of FIG. 18 requires an optical film (or a mirror). However, a device having a focus detecting function is disposed on an image pickup device 1804, and thus, the device is disposed behind a shutter 1803. Accordingly, a focus is detectable only when the shutter 1803 is in an open state.

Figure 19:
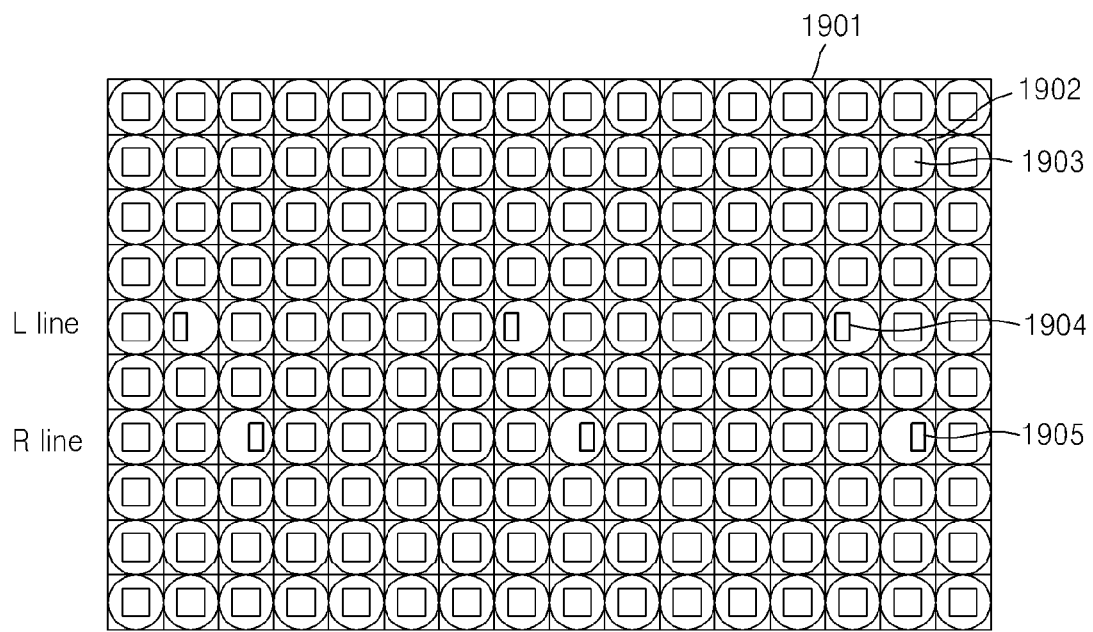
FIG. 19 is a diagram illustrating an example of an image pickup device of a digital photographing apparatus using a TTL image plane phase difference detecting AF method, according to an embodiment.

FIG. 19 is a diagram illustrating an example of an image pickup device 1901 of the digital photographing apparatus 1800 using a TTL image plane phase difference detecting AF method, according to an embodiment. FIG. 19 is a schematic diagram, and thus, shows a small number of pixels. For example, it is assumed that 20 M pixels are used. Each pixel includes a microlens 1902 and a light-receiving unit 1903. Here, L pixels 1904 for receiving only light corresponding to a left half portion of an image pickup lens, and R pixels 1905 for receiving only light corresponding to a right half portion of the image pickup lens, are configured by shielding the light-receiving unit 1903 by as much as about half of the microlens 1902, and thus, a phase difference may be detected. That is, lines including the L pixels 1904 and the R pixels 1905 shown in FIG. 6 are referred to as L line and R line, respectively. A phase difference is detected from the shift of an image position of a pixel in each of the L line and the R line. The light-receiving unit 1903 is installed in the image pickup device, and thus, this method is not affected by a change in an arrangement of an optical system such as an optical film, unlike other TTL AF methods. Instead, this method is affected by the arrangement of phase difference pixels, which is not described here.

FIGS. 20A to 20F are diagrams illustrating a method of designing a holographic optical element (HOE), according to an embodiment.

Figure 20A:
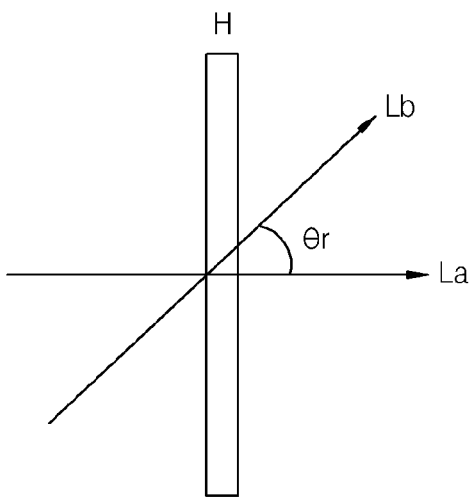
FIGS. 20A to 20F are diagrams illustrating a method of designing a holographic optical element (HOE), according to an embodiment.

FIG. 20A is a diagram illustrating properties of the HOE. Object light La is incident on a photosensitive body H, and simultaneously, reference light Lb is also incident on the photosensitive body H. Here, wavelengths of the object light La and the reference light Lb are each $\lambda 0$. An angle between object light La and reference light Lb is $\theta r$. Diffraction patterns due to interference are formed on the photosensitive body H by the two light fluxes.

Hereinafter, the properties of the HOE are described below in more detail.

Figure 20B:
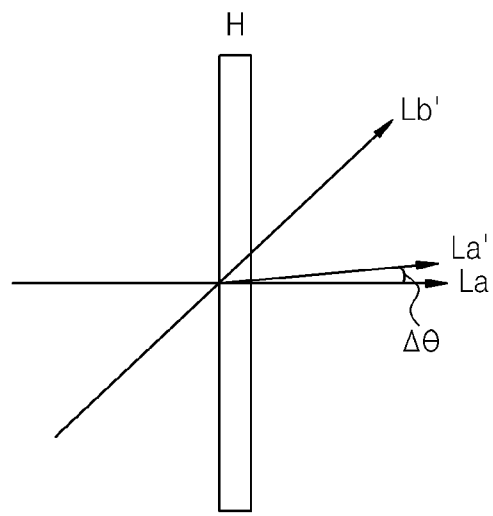

FIG. 20B is a diagram illustrating a case where the HOE is used. When reproducing reference light Lb' is incident on the photosensitive body H of the HOE, reproduction light La' is reproduced. When a wavelength of the reproducing reference light Lb' is the same as the reference light Lb used to manufacture the HOE, the reproduction light La' is reproduced in the same direction as a direction of the object light La.

In this case, when a wavelength of the reproducing reference light Lb' is $\lambda c$, reproduction light is reproduced as La'. An angle difference between the reproduction light La' and the reproduction light La is $\Delta \theta$. Accordingly, the HOE may be designed such that reproducing reference light Lb' may have the same wavelength as a wavelength during the manufacture of the HOE.

Thus far, water waves have been described. Object light may be a spherical wave such that the HOE may have power, which is a factor of design. In addition, other lenses may be omitted.

Figure 20C:
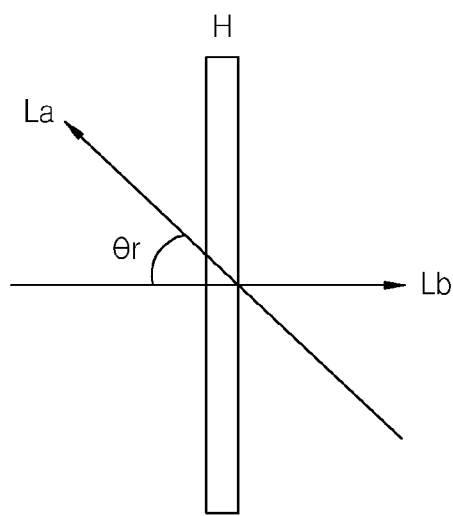

FIG. 20C is a diagram illustrating the manufacture of a reflective type of HOE. The object light La is incident on the photosensitive body H, and simultaneously, the reference light Lb is also incident on the photosensitive body H. Here, wavelengths of the object light La and the reference light Lb are each $\lambda 0$. An angle between object light La and reference light Lb is $\theta r$. Reflective types of diffraction striped patterns due to interference are formed on the photosensitive body H by the two light fluxes.

Figure 20D:
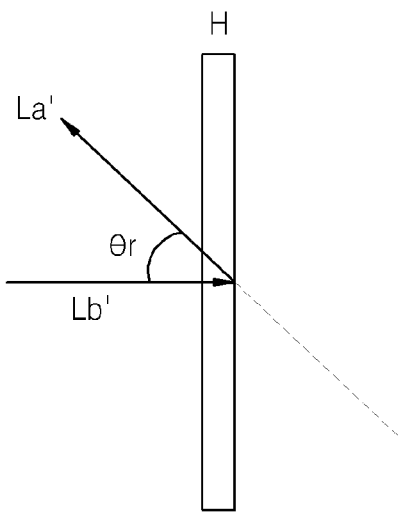

FIG. 20D is a diagram illustrating a case where the reflective type of HOE is used. When the reproducing reference light Lb' is incident on the photosensitive body H, reflective reproduction light La' is reproduced. When reproducing reference light Lb' has the same wavelength as a wavelength during the manufacture of the HOE, reproduction light La' is reproduced in the same direction as a direction of object light La.

Figure 20E:
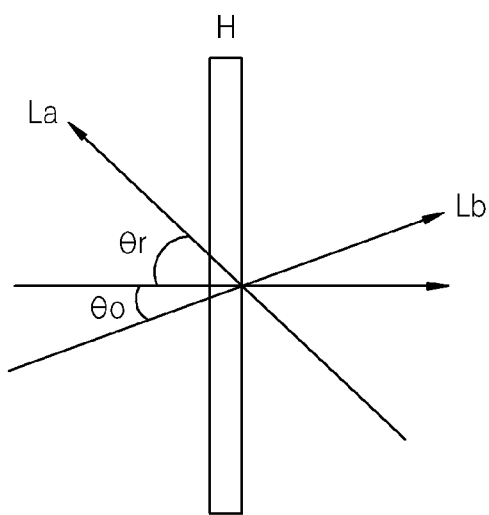

FIG. 20E is a diagram illustrating the manufacture of a reflective type of HOE. The object light La is incident on the photosensitive body H at an angle $\Theta r$, and simultaneously, the reference light Lb is incident on the photosensitive body H at an angle $\Theta o$. Here, wavelengths of the object light La and the reference light Lb are each $\lambda 0$. Reflective types of diffraction striped patterns due to interference are formed on the photosensitive body H by the two light fluxes.

Figure 20F:
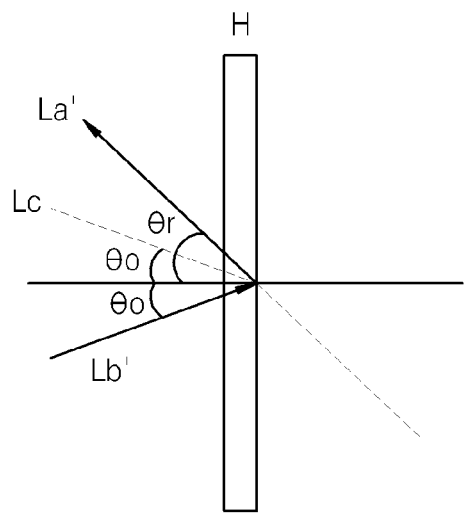

FIG. 20F is a diagram illustrating a case where the reflective type of HOE is used. When the reproducing reference light Lb' is incident on the photosensitive body H at an angle Θo, reflected light Lc is reproduced at an angle Θo in a case of a general mirror, but the reflective reproduction light La' is reproduced at an angle Θr according to the present embodiment. When reproducing reference light Lb' has the same wavelength as a wavelength during the manufacture of the HOE, reproduction light La' is reproduced in the same direction as a direction of object light La.

An optical system based on these properties may be an abnormal type of optical system as well as an optical system shown in FIG. 7A.

Hereinafter, a light-receiving unit will be described with regard to exemplary embodiments.

Figure 21:
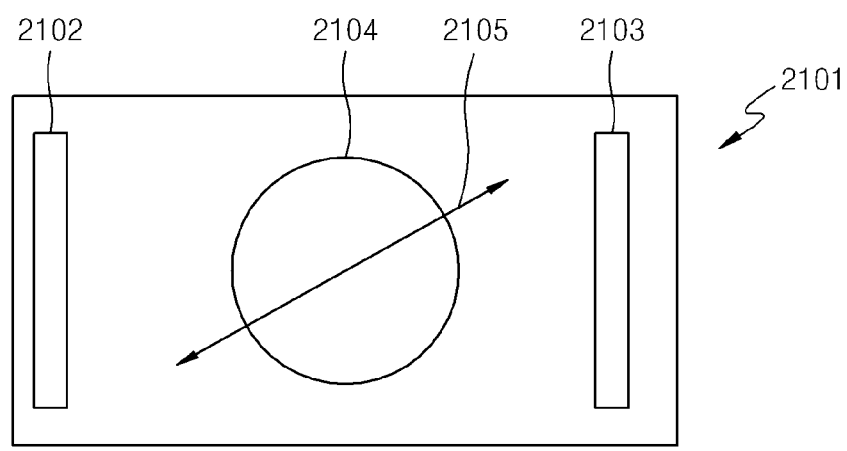
FIG. 21 is a diagram of a light-receiving unit using a TTL active AF method, according to an embodiment.

FIG. 21 is a diagram of a light-receiving unit using a TTL active AF method, according to an embodiment.

Referring to FIG. 21, the light-receiving unit is a light-receiving sensor, which may be a PSD sensor 2101. Reflected light is guided in a diagonal direction 2105.

Electrodes 2102 and 2103 are formed at two lateral ends of the PSD sensor 2101. In addition, since an image 2104 due to reflected light is guided in the diagonal direction 2105, a horizontal direction position and a central position of the reflected light are detected. A mismatch degree of a focus may be calculated based on information of the detected positions.

Figure 22:
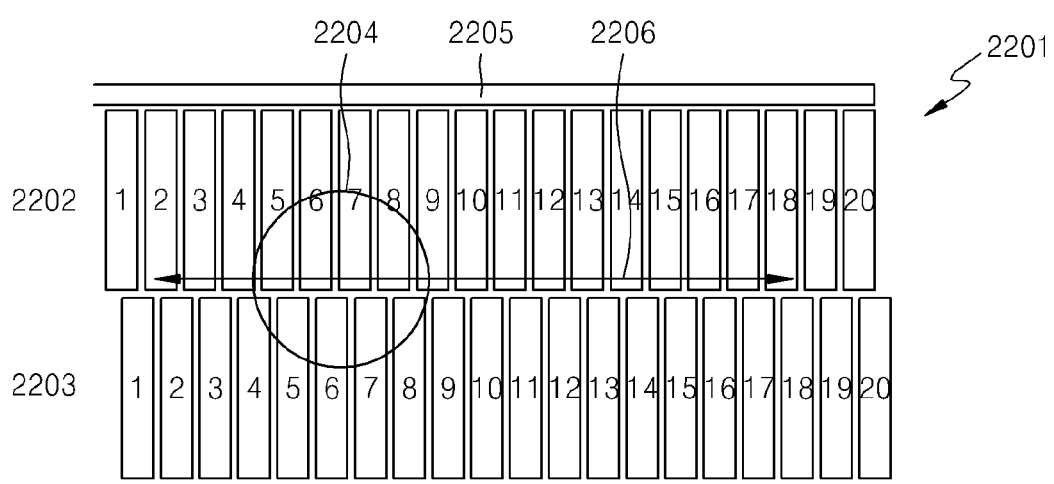
FIG. 22 is a diagram of a light-transmitting unit using a TTL active AF method, according to another embodiment.

FIG. 22 is a diagram of a light-receiving unit using a TTL active AF method, according to another embodiment. For example, the light-transmitting unit may be an light-receiving unit 913 shown in FIG. 10.

Alternatively, the light-transmitting unit may use a TTL passive AF method. For example, the light-transmitting unit may be the AF light-receiving unit 1438 shown in FIG. 15.

Referring to FIG. 22, the light-receiving unit may use a charge-coupled device (CCD) line sensor 2201 as a receiving sensor. The CCD line sensor 2201 may include a first line sensor 2202 and a second line sensor 2203 that are arranged in two lines in a zigzag form.

In addition, the light-receiving unit includes a brightness monitor 2205. The brightness monitor 2205 determines an integration time of the CCD line sensor 2201.

The CCD line sensor 2201 may be provided to have an incline such that an image 2204 due to reflected light may be guided in a line sensor direction 2206.

Figure 23:
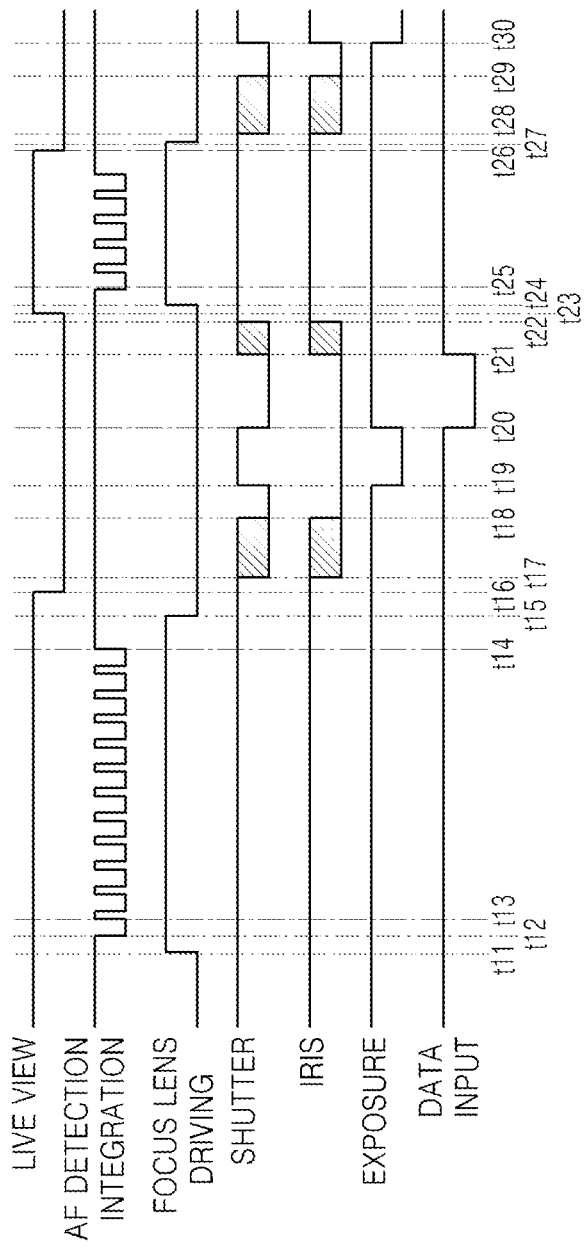
FIG. 23 is a set of timing diagrams of a case where contrast AF is performed in a general digital photographing apparatus.

FIG. 23 is a set of timing diagrams of a case where contrast AF is performed in a general digital photographing apparatus. From above, the timing diagrams of a live view, AF detection integration, focus lens driving, a shutter, an iris, exposure, and data input are shown. In FIG. 23, continuous photography for continuously capturing still images is shown. However, if only a single image is captured, the process is the same as capturing the first photograph of the continuous photography.

Here, it is assumed that a first shutter release button s1 and a second shutter release button s2 of a camera are pushed simultaneously. That is, an AF operation is performed, and then, shutter release is performed when focusing is achieved.

First, a focus lens is driven (t11). Then, the image pickup device begins to perform integration for AF in order to detect a focus (t12). In this case, the integration is performed in synchronization with a vertical synchronization signal VD of the image pickup device.

Then, one integration operation for AF is finished (t13). The integration is repeated to terminate an overall integration operation (t14). For example, when a digital photographing apparatus operates at 120 fps, a time of one integration operation may be 8.3 ms.

During a time period between t13 and t14, a peak value of a contrast value is obtained, and a focus lens is driven based on the obtained peak value. Although not described in detail, a U-turn operation for detecting a peak value and correcting backlash may be repeated.

When a peak position is detected at t14, integration for AF is finished. However, the image pickup device keeps performing photography at the same time in order to display the live view image.

When the peak value of a contrast value is detected, a focus lens is driven to the peak position. When the focus lens reaches the peak position, the driving of the focus lens is finished (t15). Then, the displaying of the live view is finished (t16).

After the displaying of the live view is finished, the shutter and the iris are be driven such that the shutter may be closed and the iris may be adjusted to have an appropriate iris value (t17 to t18). When the preparation for capturing an image is finished, the shutter is opened, and the image pickup device is exposed for a necessary exposure period of time (t19 to t20). In addition, when the exposure is finished, image data of a subject is read (t20 to t21).

When the reading of the image data is finished, the shutter and the iris are opened again (t21 to t22). In addition, the live view image is displayed again (t23), and a new AF operation begins to be performed from t24. The operations from t25 to t30 are the same as the operations from t12 to t19.

However, in the contrast AF method, an operation for detecting contrast while performing AF driving must be repeated in order to detect the peak position. Thus, it takes a time to detect the peak position. In addition, since it takes time to perform AF at the continuous photography timing, it is impossible to increase the number of times of continuous photography while AF is performed. In addition, it is difficult to perform prediction AF on a moving object.

In a TTL active AF method, if a condition is not seriously bad, a focus position may be detected by using a first detecting operation during AF driving. That is, focusing may be achieved via one detecting operation only. Thus, AF may be performed at a high speed, and it is possible to increase the number of times of continuous photography and easy to perform prediction AF on a moving object.

Figure 24:
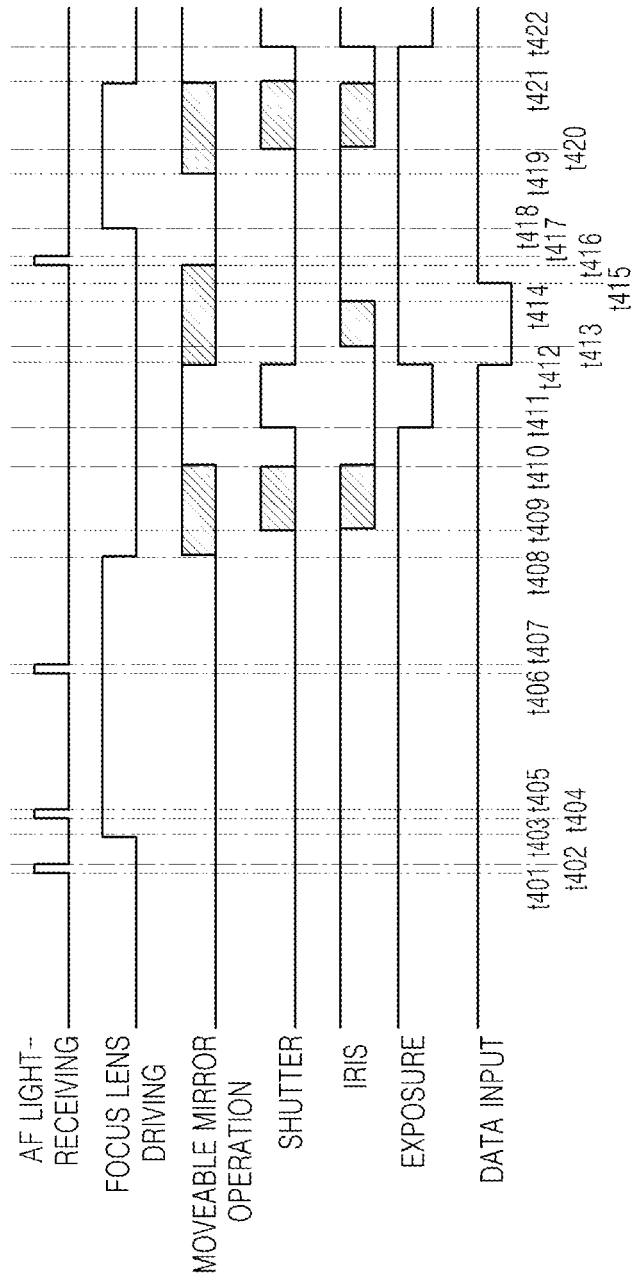
FIG. 24 is a set of timing diagrams of a case where a TTL passive phase difference AF method is performed by using a general DSLR digital photographing apparatus including a moveable mirror, that is, a main mirror and a sub-mirror.

FIG. 24 is a set of timing diagrams of a case where a TTL passive phase difference AF method is performed using a general DSLR photographing apparatus. The general DSLR photographing apparatus includes a moveable mirror, that is, a main mirror and a sub-mirror. The DSLR photographing apparatus does not include a live view display. In FIG. 24, from above, the timing diagrams of AF light-receiving, focus lens driving, a moveable mirror operation, a shutter, an iris, exposure, and data input are shown. FIG. 24 is a diagram illustrating typical continuous photography. Here, it is assumed that a first shutter release button and a second shutter release button of a camera are simultaneously pushed. That is, an AF operation is performed, and then, shutter release is performed when focusing is achieved.

When AF light-receiving is performed, a phase difference AF module installed above or below the digital photographing apparatus performs AF light-receiving for a time period between t401 and t402.

Then, when a focus position is obtained by performing a focus detection calculation, a focus lens is driven (t403). An AF sensor also receives light during the driving of the focus lens, and focus detection is performed (t404 to t405). For a time period between t406 and t407, the AF sensor performs integration and focus detection. That is, during the driving of the focus lens, the focus lens is moved while the result of the focus detection calculation is updated. In addition, when the focus lens reaches the focus position, the focus lens stops being moved (t408).

At time t408, when the shutter release button is pushed, the moveable mirror is moved upward (t408 to t410). For a time period between t409 and t410, the shutter is charged, and the iris is driven to be adjusted to an appropriate iris value according to a measured light amount (t409 to t410). When the preparation for capturing an image is finished, the shutter is opened, and the image pickup device is exposed for a necessary exposure period of time (t411 to t412). In addition, when the exposure is finished, the moveable mirror is moved downward for a time period between t412 to t416. The iris is restored to an open state for a time period between t413 and t414. When the moveable mirror is moved downwards and the iris is opened, light required to detect a focus reaches an AF module so as to detect the focus. In addition, the AF sensor performs AF light-receiving for the next photograph, and focus detection is performed (t416 to t417). When the focus position is obtained, the focus lens is driven (t418). In addition, for a time period between t419 and t421, the moveable mirror is moved upwards for the next photograph. In addition, these operations are repeated starting with t422.

Since the moveable mirror is driven using the method of the DSLR, a standby time for stabilizing the moveable mirror, in particular, the sub-mirror for AF, is required. Thus, it is impossible to increase a speed of continuous photography.

Figure 25:
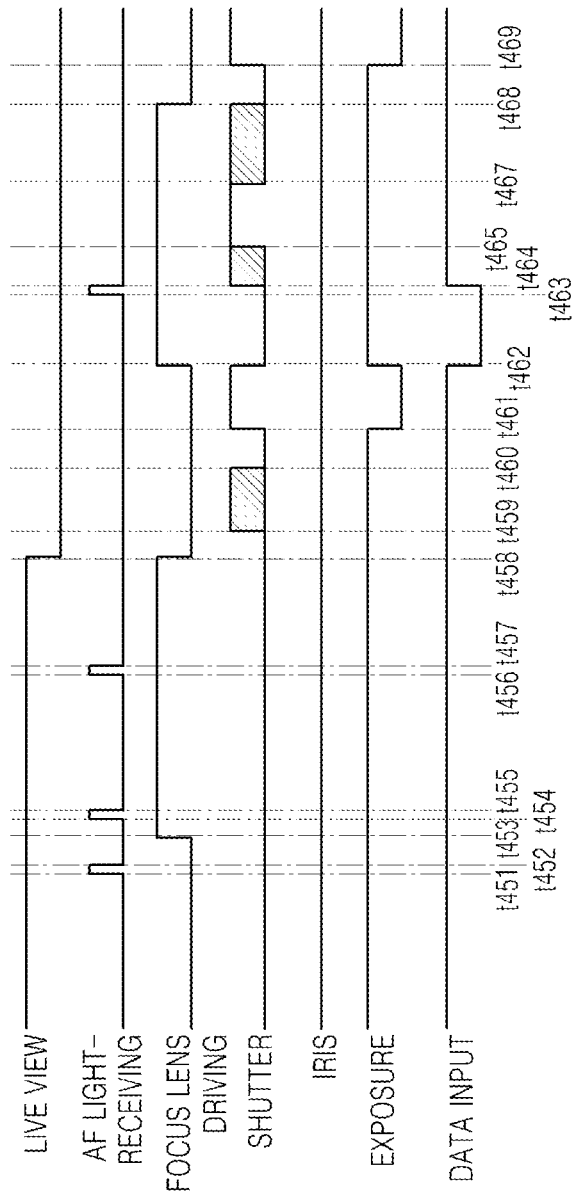
FIG. 25 is a set of timing diagrams of a case where a TTL passive phase difference AF method is performed by using a general digital photographing apparatus using a pellicle mirror and including a fixed mirror.

FIG. 25 is a set of timing diagrams of a case where a TTL passive phase difference AF method is performed using a general digital photographing apparatus that includes a pellicle mirror and a fixed mirror. The general digital photographing apparatus includes a live view display, unlike in FIG. 24. From above, the timing diagrams of a live view, AF light-receiving, focus lens driving, a shutter, an iris, exposure, and data input are shown. FIG. 25 is a diagram for describing typical continuous photography. Here, it is assumed that a first shutter release button and a second shutter release button of a camera are simultaneously pushed. That is, when focusing is achieved by AF, shutter release is performed.

The method of FIG. 25 is similar to the method of 24, and thus, will be described in terms of its differences from the method of FIG. 24.

When an AF operation is performed, an AF sensor of a phase difference AF module installed above the digital photographing apparatus receives light. An operation of performing AF is the same as in FIG. 24. However, in FIG. 25, since the live view is displayed, when the shutter release button is pushed at a time t458, the live view is not displayed. Since there is no moveable mirror, a standby time for moving a mirror upward is not required.

In a general digital photographing apparatus with the timing diagram of FIG. 25, an iris value is fixed to F3.5 in order to increase an AF speed during continuous photography. When a shutter release operation has begun, the live view is not displayed. Instead, a recorded image is displayed after photography is performed. That is, in order to perform continuous photography at a high speed, a subject image in real time is omitted. Since display of the subject image is postponed, continuous photography may be performed at a high speed. However, the subject is not checkable, and thus, a desired image is not capable of being captured. In addition, since an iris value is fixed, it may not be controlled. That is, a depth or background of the subject may not be controlled.

Figure 26:
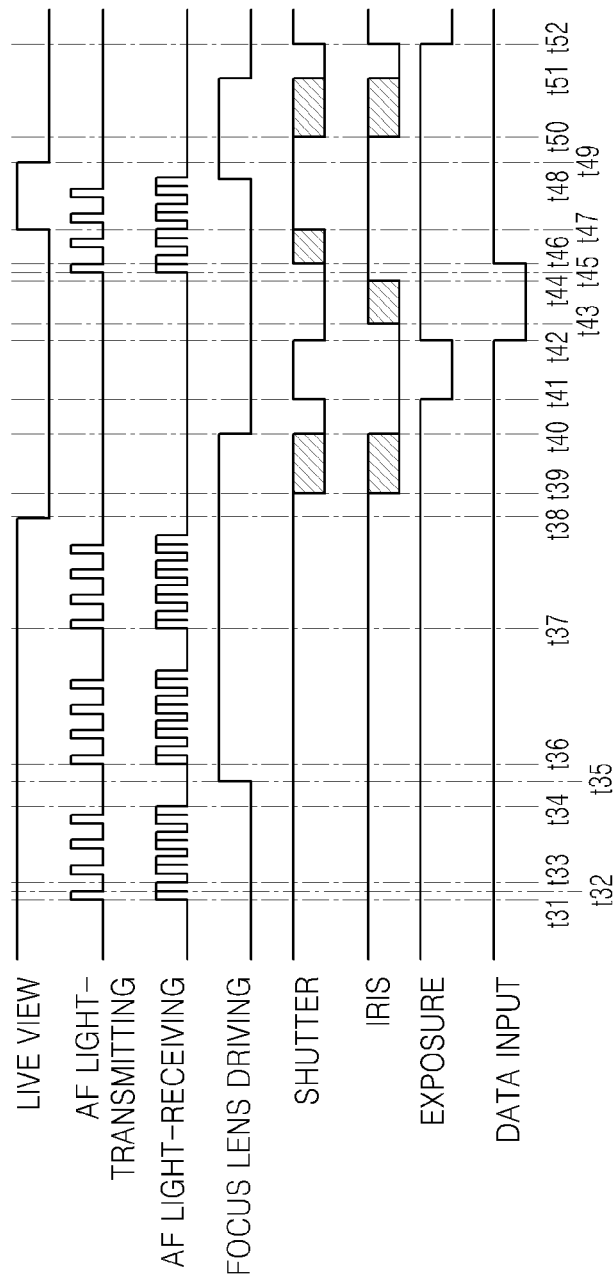
FIGS. 26 to 29 are timing diagrams of cases where a TTL active AF method is performed, according to various embodiments.

FIG. 26 is a set of timing diagrams illustrating a case where a TTL active AF method is performed, according to an embodiment.

Referring to FIG. 26, from above, the timing diagrams of live view, AF light-transmitting, AF light-receiving, focus lens driving, a shutter, an iris, exposure, and data input are shown. In FIG. 26, continuous photography is shown. However, if only a single image is captured, the process is the same as capturing the first photograph of the continuous photography.

Here, it is assumed that a first shutter release button and a second shutter release button of a camera are pushed simultaneously. That is, an AF operation is performed, and then, shutter release is performed when focusing is achieved.

First, an AF operation begins (t31). In this case, it is not required to drive a focus lens. At time t31, a light-transmitting unit begins to perform AF light-transmitting, and simultaneously, a light-receiving unit begins to perform AF light-receiving. That is, reflected light is received at a focus mismatch position on a light-receiving sensor.

Then, the AF light-transmitting and the AF light-receiving are finished (t32). Simultaneously, the light-receiving sensor performs the AF light-receiving again for the next light-receiving operation. Then, the AF light-receiving is finished (t33).

For a time period between t31 and t32, external light and reflected light due to AF light-transmitting are received. For a time period between t32 to t33, only the external light is received. Thus, a difference between data that is primarily received and data that is secondarily received is calculated to generate differential data using the image retainer 111 and the calculator 112 of FIG. 1. As a result, an external light component is removed from the data that is primarily received to extract only a reflective signal generated by the transmitted light. In addition, this operation is repeated four times to integrate the differential data. That is, the light-transmitting unit performs modulation and the light-receiving unit is in synchronization with the modulation of the light-transmitting unit so as to obtain a difference between the light-transmitting data and the light-receiving data.

Here, a time period between t31 and t32 is the same as a time period between t32 and t33. In addition, the time period is determined according to the size of a light-receiving signal, that is, brightness. For example, the time period may be several μs to several ms.

By performing the above described operation, four integration operations of the differential data are finished at a time t34. According to the present embodiment, the number of times for integrating the differential data is set to 4 times, but this is just an example. Thus, the number of times may be changed in various ways.

Then, a focus position is detected from the integrated data, and the focus lens begins to be driven (t35).

The focus position may be detected by only one calculating operation to achieve focusing. However, in consideration of a case when a subject moves, or when a panning operation is performed by a digital photographing apparatus, or when a function used to calculate a driving degree for driving the focus lens is changed during AF, a TTL active AF operation begins again during the driving of the focus lens (t36).

At a time t37, a third TTL active AF operation begins. This operation is repeated until the driving of the focus lens is finished. The number of repetition may be changed according to the focus lens, a defocus degree, or the like.

Then, the display of a live view image is finished and the preparation of a shutter release operation is performed (t38). Also, the driving of the focus lens is continuously performed.

Driving of the shutter and the iris begins at the beginning of the shutter release operation (t39). The shutter is closed and the iris is adjusted to have an appropriate iris value to finish the driving (t40). Simultaneously, at a time t40, the driving of the focus lens is finished. Times t38 and t39 are set such that the driving of the focus lens is finished at the time t40.

Then, when the preparation for capturing an image is finished, the shutter is opened, and the image pickup device 114 of FIG. 1 is exposed for a necessary exposure period of time (t41 to t42). In addition, when the exposure is finished, image data of a subject is read (t42 to t46).

For a time period between t43 to t44, the iris is restored to an open state. Since the shutter is used for reading the image data, the shutter is maintained opened. In addition, a TTL active AF operation begins during continuous photography (t45). This operation is the same as the operation at a time t31. For a time period between t46 to t47, the shutter is restored to an open state. That is, regardless of the opening of the shutter, the AF operation begins. In addition, when the shutter is opened, a live view image is displayed again (t47).

At a time t48, the focus position is detected and the focus lens begins to be driven. In addition, at a time t51, a focus is achieved. At a time t49, the displaying of the live view image is finished. For a time period between t50 and t51, the shutter and the iris are driven. As described above, the AF operation and the exposure are repeated starting at t52.

According to the above described method, a time required to detect a focus during continuous photography may be 100 μs to several ms. In addition, during a release time lag, the focus lens is driven. Thus, it is easy to increase the number of times of continuous photography. In addition, since the focus position is calculated by a single measurement, it is also easy to perform an operation prediction calculation. In contrast AF, it is easy to perform AF and continuous photography at a high speed, compared with a case where AF during continuous photography requires a period of time of several tens of ms to several hundreds of ms.

In addition, in order to perform photography at a high speed, the displaying of a live view is omitted. In order to display the live view, the shutter needs to be opened. To this end, AF timing is postponed, and thus, a photographing speed is postponed. However, according to an embodiment, after or while the iris is restored to be opened, when an iris value becomes an appropriate value, AF may be performed before the shutter is opened. Thus, continuous photography may also be performed at a high speed while the live view is displayed. That is, the above operations are repeated during the continuous photography. Thus, AF having a high precision may be performed while a subject may be tracked through the live view in real time, and continuous photography may be performed at a high speed.

Figure 27:
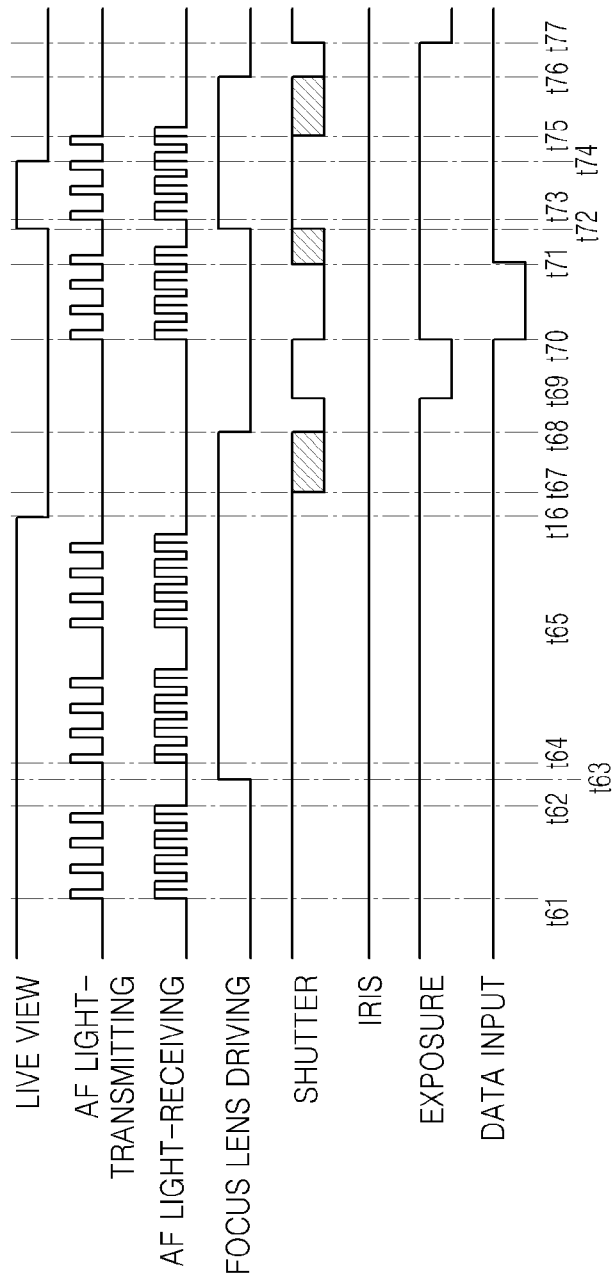

FIG. 27 is a set of timing diagrams illustrating a case where a TTL active AF method is performed, according to an embodiment. According to the present embodiment, it is assumed that a pellicle mirror is used as an optical film and visible light is used as light used for AF. In addition, in order to perform continuous photography at a high speed, it is assumed that a mode for controlling an iris to be opened or an iris is fixed to have a predetermined F number, for example, F7.0.

Operations until a time t70 are the same as the operations from t31 to t45 of FIG. 26 except that the iris value is fixed and controlled. In addition, from the time t70, image data of a subject due to exposure is read, and simultaneously, a TTL active AF operation begins during continuous photography. This is the same as an operation at a time t61.

Since a light flux for AF is not limited by the iris, an AF operation may begin after the exposure is finished (t70). Then, the shutter is opened (t71 to t72) and the focus lens begins to be driven (t72). Simultaneously, the live view image begins to be displayed.

Then, a second TTL active AF operation begins, but may be omitted (t73). Next, the same operations as shown in FIG. 26 are repeated, and thus, are not described.

According to the above described method, AF may begin at an earlier time during continuous photography than in the focus detecting method of FIG. 26, and thus, a speed of continuous photography may be further increased.

Figure 28:
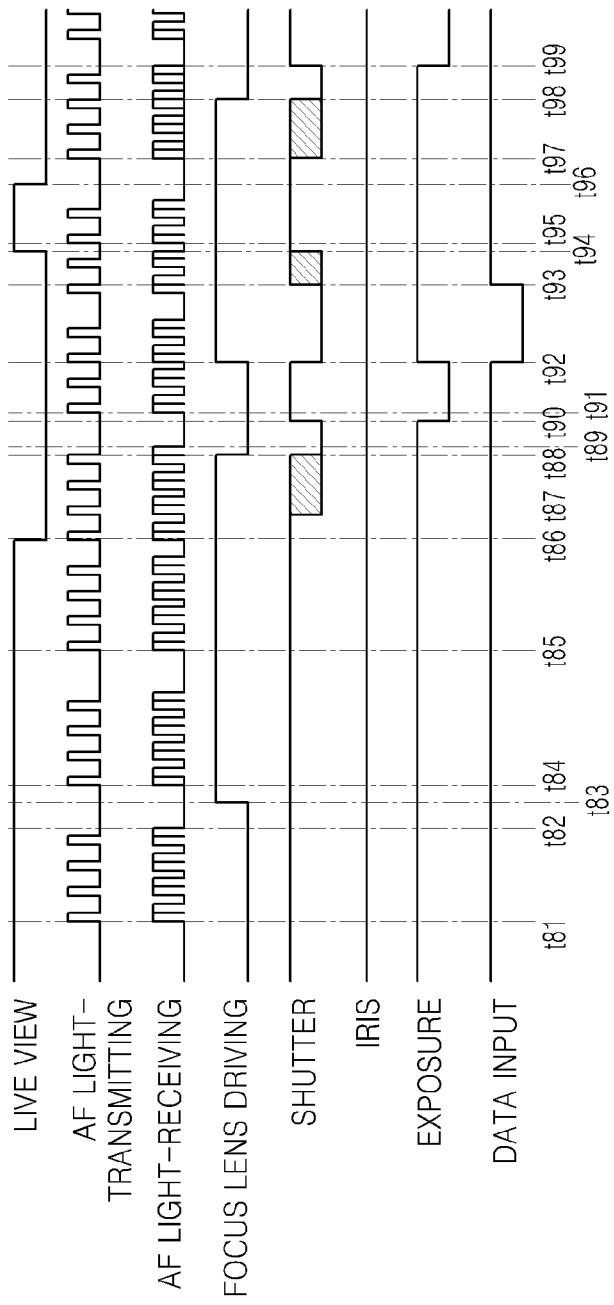

FIG. 28 is a set of timing diagrams illustrating a case where a TTL active AF method is performed, according to an embodiment. According to the present embodiment, it is assumed that an HOE or a pellicle mirror is used as an optical film, and infrared rays are used as light used for AF light-transmitting. In addition, it is assumed that a mode for controlling an iris to be opened or an iris is fixed to have a predetermined F number, for example, F7.0.

The method of FIG. 28 is similar to the method of FIG. 27, except that TTL active AF is performed during exposure. That is, for a time period between t86 to t89, a focus position may be detected by performing the TTL active AF, and thus, an AF response speed may be increased while many AF detecting operations are performed. In addition, during exposure for a time period between t90 to t92, the focus position may also be performed via TTL active AF. By blocking infrared rays from among light rays incident on the image pickup device 114, an AF operation may be performed during the exposure, as described above.

For a time period between t83 to t88, a focus lens is driven. When the focus lens is driven, the AF operation is repeated based on the latest detected information about a focus position. Thus, it is not required to synchronize the driving of the focus lens with the focus detection via the TTL active AF. However, when a direct current (DC) motor that takes a long time to make a driving speed of the focus lens constant is used, a standby state is required until the driving speed of the focus lens becomes constant.

Figure 29:
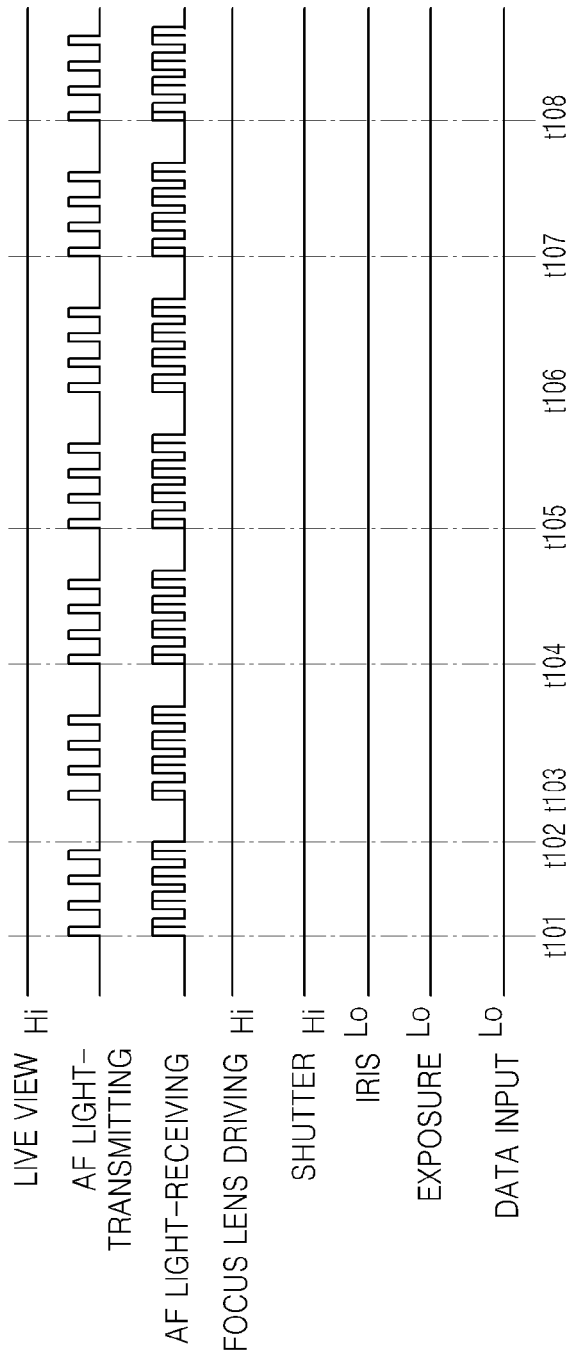

FIG. 29 is a set of timing diagrams illustrating a case where a TTL active AF method is performed, according to an embodiment. According to the present embodiment, it is assumed that photography is performed to capture a video image. It is assumed that an HOE or a pellicle mirror is used as an optical film, and infrared rays are used as light used for AF light-transmitting. In addition, it is assumed that a mode for controlling an iris to be opened or an iris is fixed to have a predetermined F number, for example, F7.0.

According to the present embodiment, focus detection via TTL active AF is performed at the same interval. In addition, the focus lens is driven constantly. Of course, a subject does not move. If focusing is obtained, the driving of the focus lens is stopped.

According to the present embodiment, since the video image is captured, the shutter is maintained open, and a mode for controlling an iris to be opened or an iris is fixed to have a predetermined F number, for example, F7.0. In addition, after photography is performed to capture the video image, since an exposure state is maintained, image data is input constantly.

Figure 30:
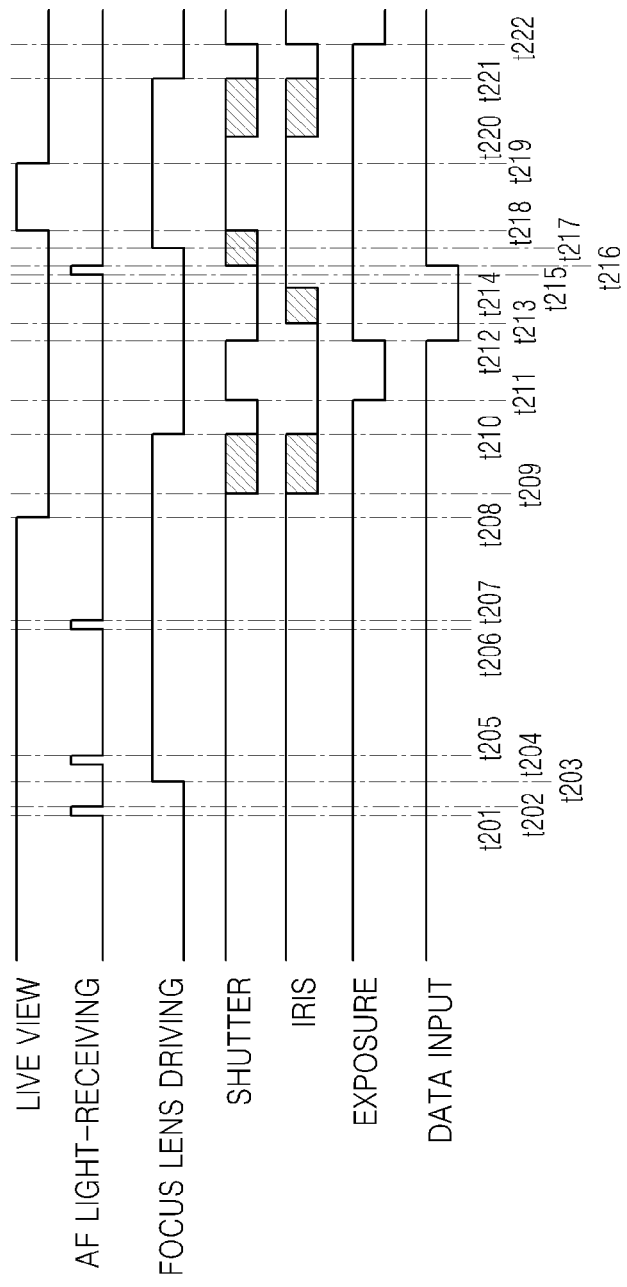
FIG. 30 is a timing diagram of a case where a TTL passive phase difference AF method is performed by using a digital photographing apparatus using an optical film and including a fixed mirror, according to another embodiment.

FIG. 30 is a set of timing diagrams illustrating a case where a TTL passive phase difference AF method is performed using a digital photographing apparatus having an optical film and a fixed mirror, according to another embodiment. Referring to FIG. 30, from above, the timing diagrams of a live view, AF light-transmitting, AF light-receiving, focus lens driving, a shutter, an iris, exposure, and data input are shown. FIG. 30 is a diagram for describing continuous photography. However, if only a single image is captured, the process is the same as capturing the first photograph of the continuous photography.

Here, it is assumed that a first shutter release button and a second shutter release button of a camera are pushed simultaneously. That is, an AF operation is performed, and then, shutter release is performed when focusing is achieved.

When an AF operation begins, an AF sensor of a phase difference AF module installed below the digital photographing apparatus receives light (t201 to t202). Then, a focus detection calculation is performed. When a focus position is obtained, the focus lens begins to be driven at a time t203. During the driving of the focus lens, the AF sensor receives light so as to detect a focus (t204 to t205 and t206 to t207). That is, during the driving of the focus lens, the result of the focus detection calculation is updated and the driving of the focus lens is continuously performed. In addition, when the focus lens reaches the focus position, the preparation for a shutter release operation is performed at a time t208. In addition, the focus lens is continuously driven until a time t210 in order to perform AF at a high speed. Displaying of a live view is finished due to the beginning of the shutter release operation.

Due to the beginning of the shutter release operation, a shutter is opened once, and simultaneously, is charged at a time period between t209 and t210. For a time period between t209 and t210, the iris is adjusted to have an appropriate iris value according to a measured light amount. In addition, for a time period between t211 and t212, the shutter is opened such that the image pickup device 114 may be exposed. When the exposure is finished, the iris is restored to an open state for a time period between 213 and t214. In this case, when the iris is opened to have a predetermined F number, light for detecting a focus reaches the AF module, and thus, it is possible to detect a focus. That is, when an iris value required for AF is satisfied, focus detection may be performed. In addition, after the iris is completely restored to an open state, AF may be performed. For example, when an exchangeable lens has a low open iris value, a standby state may be maintained until the iris is completely restored to an open state.

Thus, for a time period between t215 and t216, integration in the AF sensor is performed and a focus is detected.

In particular, in FIG. 30, the iris is completely adjusted, but the AF sensor also begins to receive light before the shutter is opened. However, when a preset iris value is F2.8, that is, when a preset iris value is lower than F7, it is sufficient to begin AF light-receiving from a point in time when an iris value exceeds an iris value F7 required for AF integration. When a focus position is obtained via focus detection, the focus lens begins to be driven (t217). In addition, when the shutter is completely opened (t218), a live view begins to be displayed. That is, conventionally, in order to perform continuous photography at a high speed, the displaying of the live view is omitted during continuous photography. In order to display the live view, the shutter needs to be opened during continuous photography. To this end, AF timing is postponed, and thus, a photographing speed is postponed. However, according to an embodiment, after or while the iris is restored to an open state, when an iris value becomes an appropriate iris value for AF, AF may be performed before the shutter is opened. Thus, continuous photography may also be performed at a high speed while the live view is displayed. That is, the above operations are repeated during the continuous photography. Thus, AF having a high precision may be performed while a subject may be tracked through the live view in real time, and continuous photography may be performed at a high speed.

Figure 31:
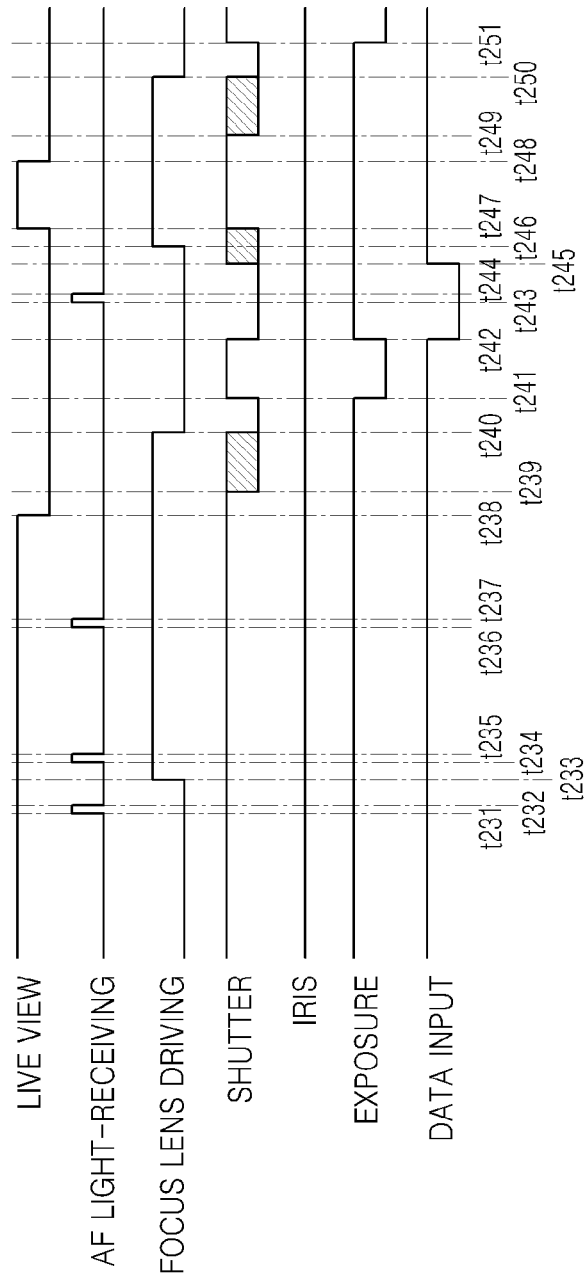
FIG. 31 is a timing diagram of a case where a TTL passive phase difference AF method is performed by using a digital photographing apparatus using an optical film and including a fixed mirror, according to another embodiment.

FIG. 31 is a set of timing diagrams illustrating a case where a TTL passive phase difference AF method is performed using a digital photographing apparatus having an optical film and a fixed mirror, according to another embodiment. The timing diagrams of FIG. 31 are similar to those of FIG. 30, and thus, the timing diagrams of FIG. 31 are described in terms of their differences from the timing diagram of FIG. 30. An iris is opened according to a measured light amount, or is fixed to have several values such as F7. In addition, during continuous photography, AF light-receiving is performed for a time period between t243 to t244, which is not a time t242 when the shutter is closed or operation time period between t245 to t247 when the shutter is restored to an open state again. In addition, a focus detection calculation is performed and the focus lens begins to be driven (t246) in order to prevent focus-detection errors from occurring due to movement of the shutter.

Figure 32:
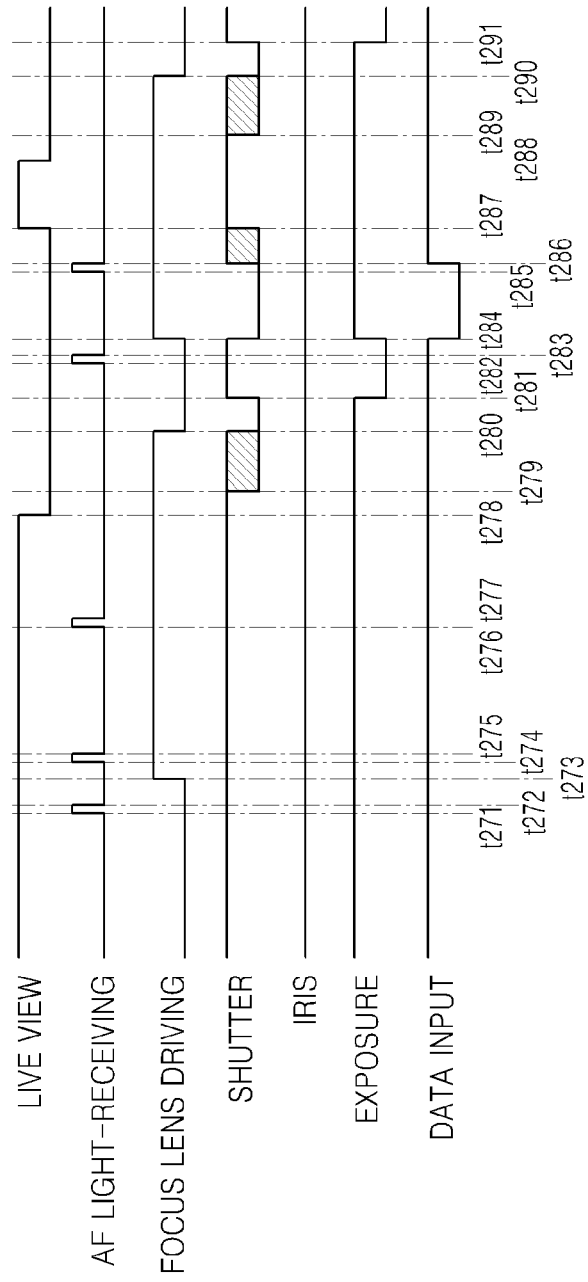
FIG. 32 is a timing diagram of a case where a TTL passive phase difference AF method is performed by using a digital photographing apparatus using an optical film and including a fixed mirror, according to another embodiment.

FIG. 32 is a set of timing diagrams illustrating a case where a TTL passive phase difference AF method is performed using a digital photographing apparatus having an optical film and a fixed mirror, according to another embodiment. The timing diagrams of FIG. 32 are similar to those of FIG. 31, and thus, the timing diagrams of FIG. 32 are described in terms of their differences from the timing diagrams of FIG. 31 In FIG. 32, when there is no movement of the shutter for a period of time during photography, that is, for a time period between t281 and t284 when the shutter is opened, integration for detecting a focus is performed (t282 to t283), and thus, AF is performed earlier than in FIG. 31. That is, since the focus lens begins to be driven early, a moving subject may be easily tracked, and the number of times of continuous photography may be increased. In addition, during the driving of the focus lens, AF light-receiving for detecting a focus is performed (t285 to t286), and thus, the moving subject may be more easily tracked.

Figure 33:
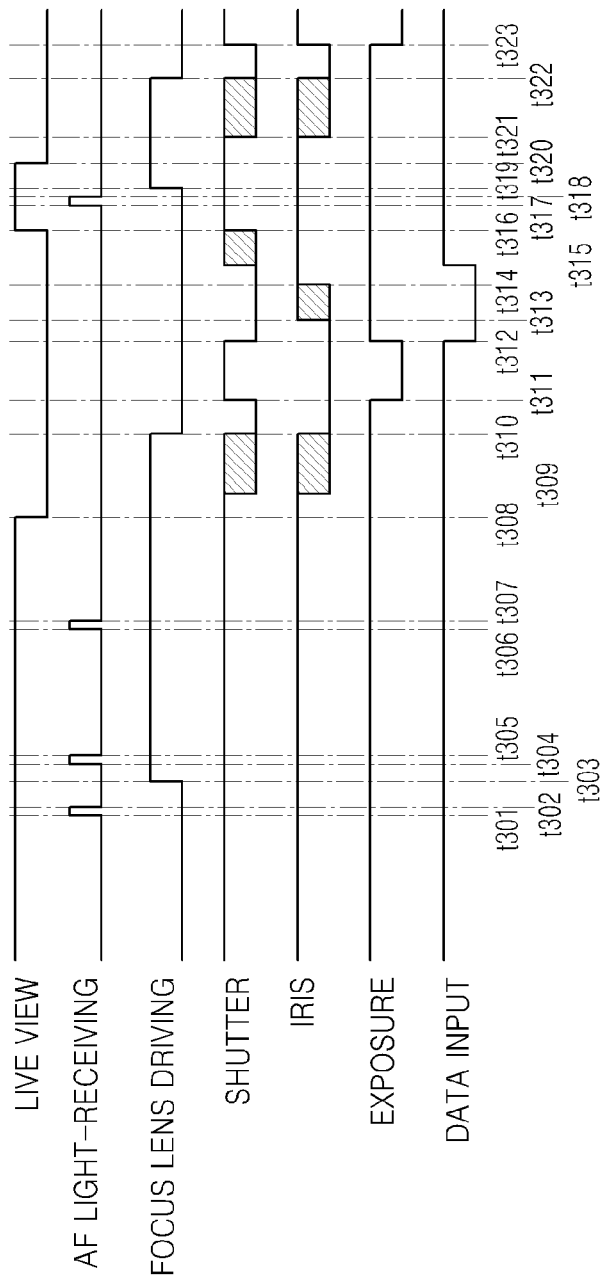
FIG. 33 is a timing diagram of a case where a TTL image plane phase difference AF method is performed, according to an embodiment.

FIG. 33 is a set of timing diagrams of a case where a TTL image plane phase difference AF method is performed, according to an embodiment. The timing diagrams of FIG. 33 are similar to those of FIG. 30, and thus, the timing diagrams of FIG. 33 are described in terms of their differences from the timing diagrams of FIG. 30. The TTL image plane phase difference AF method of FIG. 33 has the feature of detecting a focus only when the shutter is opened. According to the present embodiment, the focus is detected in connection with a case where the live view is displayed. Thus, the focus is detectable only when the shutter is opened, that is, from a point in time when the digital photographing apparatus is driven to a time t309, and a time period between t316 and t321. A phase difference pixel output from the live view is extracted to perform a phase difference calculation. In addition, since the phase difference pixel output is generally affected by the influence of the iris of the image pickup lens 101, the iris may be fixed to have a fixed value. Thus, the iris may be controlled such that an iris value reaches a predetermined iris value, for example, a maximum-opening iris value F of an image pickup lens, and then, the focus is detected. In addition, the predetermined value of the iris may be a value for easily controlling exposure, such as F3.5 or F5.6 in addition to the maximum-opening iris value F. After first photography, light is received to detect a focus for a time period between t317 and t318, and an operation of driving the focus lens is repeated for a time period between t319 and t322.

Figure 34:
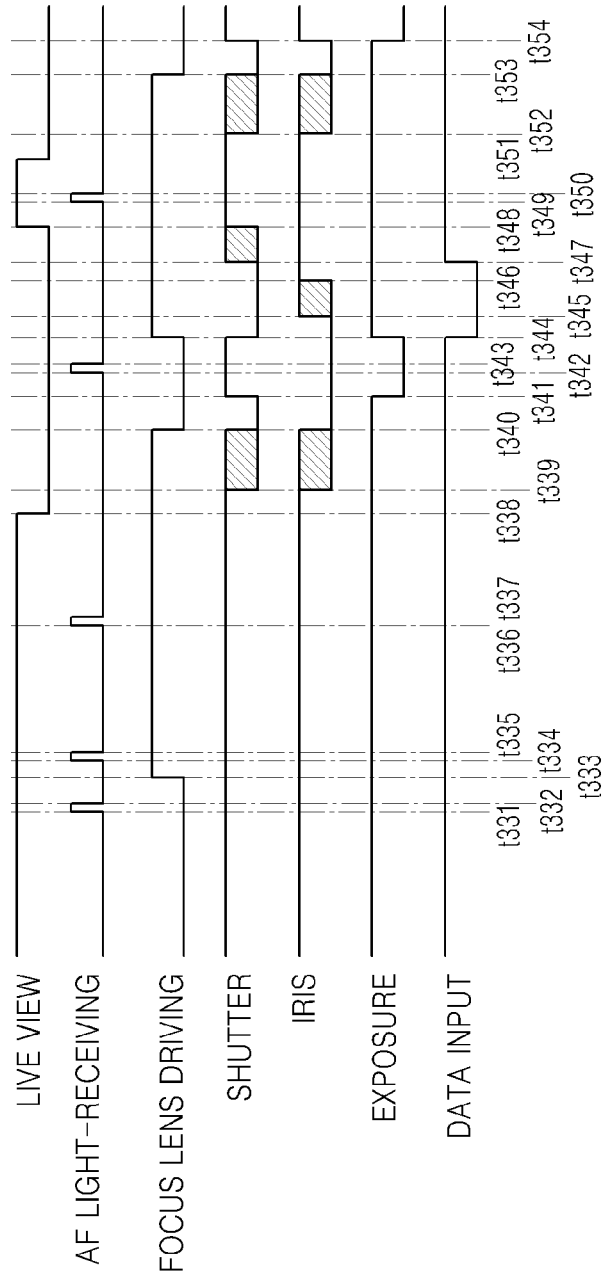
FIG. 34 is a timing diagram of a case where a TTL image plane phase difference AF method is performed, according to another embodiment.

FIG. 34 is a set of timing diagrams illustrating a case where a TTL image plane phase difference AF method is performed, according to another embodiment. The timing diagrams of FIG. 34 are similar to those of FIG. 33, and thus, the timing diagrams of FIG. 34 are described in terms of their differences from the timing diagrams of FIG. 33. In FIG. 33, the focus is detected in connection with a case where the live view is displayed. On the other hand, according to the present embodiment, the focus may also be detected during photography. That is, while the image pickup device 114 captures an image, phase difference pixels included the image pickup device 114 may be simultaneously extracted.

Thus, light is received to detect a focus during photography for a time period between t342 and t343, a focus detection calculation is performed, and the focus lens is driven at a time when exposure is finished, that is, for a time period between t344 and t353 when the shutter is closed. This is because focus mismatch or oscillation is prevented due to driving of the focus lens during photography. If a degree of driving the focus lens is within a focus depth or a voice coil motor that does not oscillate is used, the focus lens may be driven during photography. In addition, while the focus lens is driven, the next integration for detecting a focus in a time period between t348 and t352 may be performed when the shutter is opened (t349 to t350) to update a degree of driving the focus lens.

When the focus is detected during photography, a time for detecting the focus and driving the focus lens is increased. Thus, it is easy to focus on a moving subject. In addition, the number of times of continuous photography may be increased.

As described above, by configuring timings, AF performance for photographing a moving subject may be ensured while the live view is displayed. In addition, the number of times of continuous photography may be increased. Also, in a mode of a digital photographing apparatus, a still image may be output and continuous photography may be performed by detecting a focus only without displaying the live view. In this case, it is difficult to display a moving subject as a live view image, but a speed of continuous photography may be increased.

FIGS. 35 to 41 are flowcharts illustrating a method of controlling a digital photographing apparatus, according to various embodiments.

Figure 35:
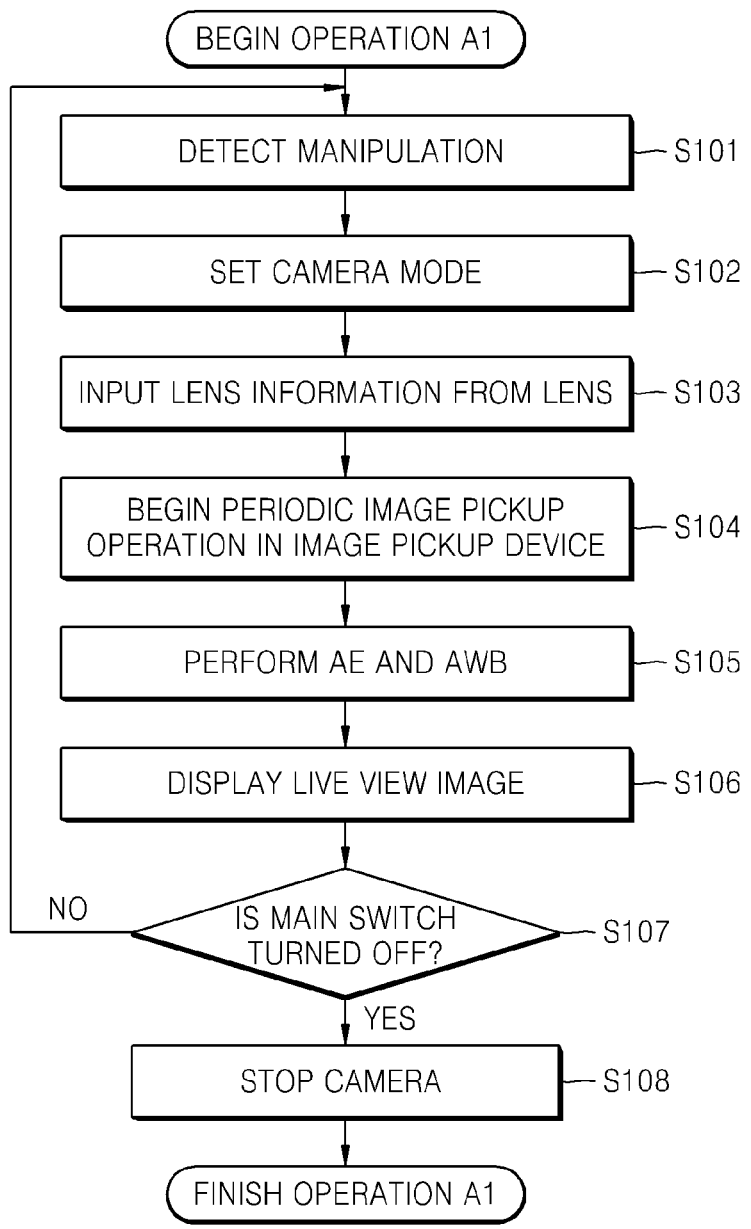
FIGS. 35 to 41 are flowcharts of a method of controlling a digital photographing apparatus, according to various embodiments.

Referring to FIG. 35, when a main switch is turned on, operation A1 begins. The digital photographing apparatus detects manipulation of a user via a key or a button (S101). In addition, when the manipulation is detected, a mode of the digital photographing apparatus is set according to the detected manipulation (S102).

In addition, lens information is received from a lens and is input (S103), and an image pickup device begins a periodic image pickup operation (S104). When an image signal is input at the beginning of the image pickup operation, AE and AWB processes are performed (S105) and a live view image on which the AE and AWB processes are performed is displayed (S106).

Then, when the main switch of the digital photographing apparatus is maintained turned on, the method returns to operation S101 (NO). Otherwise, when the main switch of the digital photographing apparatus is switched off (YES), an operation of the digital photographing apparatus is finished (S108).

Hereinafter, operations for performing TTL active AF, TTL active Lowcon scan, and contrast AF before a shutter release button is pushed halfway will be described.

Figure 36:
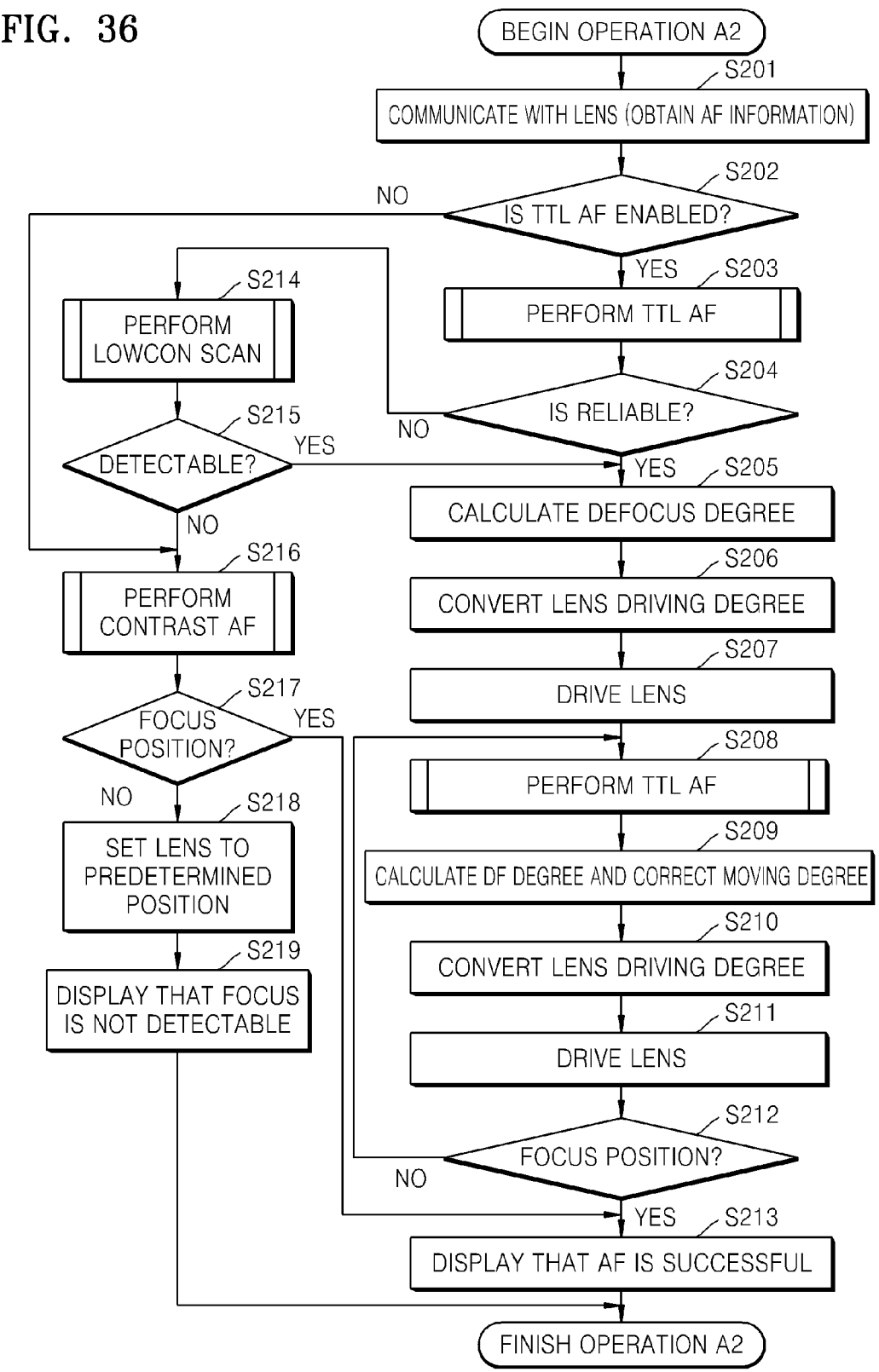

Referring to FIG. 36, a digital photographing apparatus receives latest lens information (S201). For example, the lens information is related to information about opening of an iris, whether AF is enabled, or whether AF is enabled when an iris value is F2.8 or F7.0. Then, whether TTL active AF is enabled is determined (S202).

If the TTL active AF is enabled (YES), a focus position is measured via the TTL active AF (S203). Otherwise, if the TTL active AF is not enabled (NO), the method proceeds to operation S216 to perform contrast AF. Operation S203 will be described with reference to a separate subroutine of FIG. 37.

Then, in operation S203, a focus position of a subject is measured, and whether the measurement result is reliable is determined (S204). If the measurement result is reliable (YES), the method proceeds to operation S205. Otherwise, if the measurement result is not reliable (NO), the method proceeds to operation S214.

If the measurement result is reliable in operation S204, a defocus degree DF is calculated (S205) and the calculated defocus degree is converted into a driving degree of a focus lens (S206). In addition, the focus lens is driven toward the focus position according to the driving degree (S207).

During the driving of the focus lens, TTL AF is repeated (S208). Then, as described above, a defocus degree is calculated and a moving degree is corrected (S209). In addition, the calculated defocus degree is converted into a driving degree of the focus lens (S210) and the focus lens is driven (S211).

In addition, whether the focus lens reaches the focus position, that is, whether focusing is achieved, is determined (S212). If the focusing is not achieved (NO), the method returns to operation S208. Otherwise, if the focusing is achieved (YES), that AF is successful is displayed and the method is finished (S213).

If the measurement result is not reliable in operation S204, the method proceeds to operation S214 to perform a Lowcon scan operation. The Lowcon scan operation is to perform TTL active AF by scanning the focus lens until a detectable area is formed, as described in detail with reference to a separate subroutine of FIG. 38.

If the focus position of the subject is measured in operation S214 (YES of S215), the method returns to operation S205. Otherwise, if the focus position of the subject is not measured in operation S214 (No of S215), the method proceeds to operation S216 to perform a contrast AF operation that will be described in detail with reference to a separate subroutine of FIG. 39.

When the focus position is measurable as a result of the contrast AF, if the focus position is detected (YES of S217), the method proceeds to operation S213. Otherwise, the focus lens is set to a predetermined position (S218), the focus is not detectable is displayed, and the method is finished (S219).

The above operations are performed in a single AF mode. In a continuous AF method, the method is not finished and returns to operation S201, and the operations are repeated.

Figure 37:
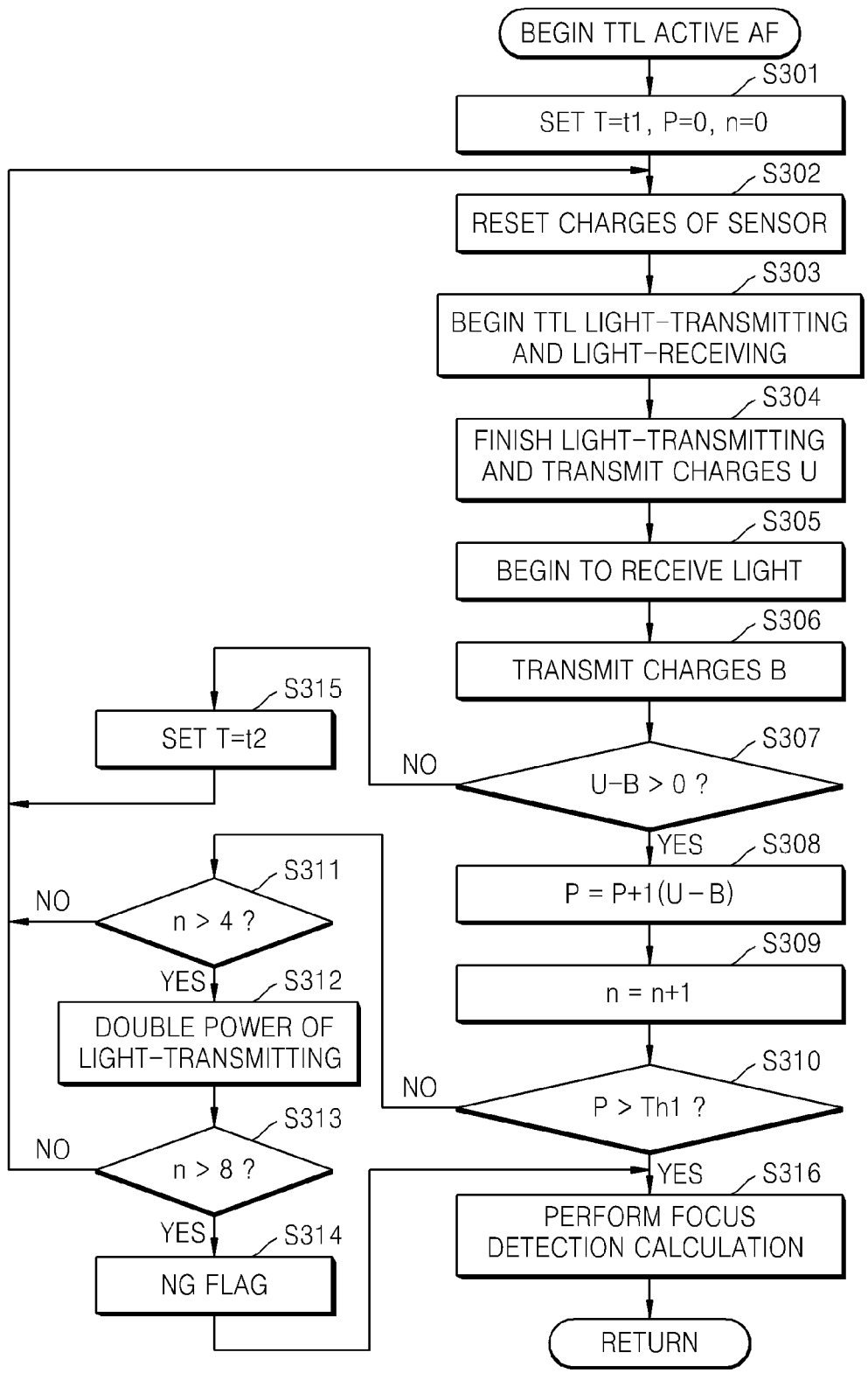

FIG. 37 is a flowchart illustrating a subroutine of TTL active AF that is one of the TTL AF methods, according to an embodiment. When a digital photographing apparatus uses TTL active AF, this subroutine is used.

When the TTL active AF begins, an initial value is set (S301). An integration time T for light-transmitting and light-receiving is set as t1, an integration value P of a reflective optical signal is set as 0, and the number of times n of light-transmitting via the TTL active AF is set as 0. In addition, a light-receiving sensor of a light receiver resets charges before receiving light (S302).

When the preparation is finished, light-transmitting and light-receiving for the TTL active AF begin (S303). In addition, the time T elapses, light-transmitting is finished, and charges U of the light-receiving sensor are transmitted (S304). Here, the charges U contain information about both reflected light via light-transmitting and reflected light due to external light.

Then, when AF light-transmitting of a light-transmitting unit is finished, that is, when light is not emitted, the reflected light due to external light is received (S305). In addition, after the time T elapses, charges B accumulated in the light-receiving sensor are transmitted (S306). Here, the charges B contain only information about the reflected light due to external light.

Then, whether U-B is a positive value, that is, whether U is greater than B is determined (S307). If U is greater than B (YES), the method proceeds to operation S308 in which P+(U−B) is input as P (S308). In addition, (n+1) is input as n (S309). That is, the counted number of times for light-transmitting and light-receiving is increased.

Whether the integrated value P exceeds a threshold value Th1 is determined (S310). If it is determined that the integrated value P exceeds the threshold value Th1 (YES), it is determined that data is reliable, and the method proceeds to operation S316 to perform a calculation for detecting a focus position (S316). Then, the method leaves the subroutine.

On the other hand, if the integrated value P does not exceed the threshold value Th1 in operation S310 (NO), it is determined that the data is not reliable, and the method proceeds to operation S311 to determine whether n exceeds four (S311). If n does not exceed 4 (NO), the method returns to operation S302 to repeat operations from S302 to S311. When n exceeds 4 (YES), even if the integration operation is performed four times, it is determined that the data is not reliable, and the power of the light-transmitting unit is doubled (S312). In addition, whether n exceeds 8 is determined (S313). If n does not exceed 8 (NO), operations from S302 to S311 are repeated. On the other hand, if n exceeds 8 (YES), it is determined that the data has low reliability, an NG flag is output so as to indicate that AF detection is not reliable (S314), and the method returns. That is, when it is determined that AF detection data has low reliability in TTL active AF, the power of the light-transmitting unit is increased or the number of times for light-transmitting unit is increased, and integration operations are repeated to increase reliability. Nevertheless, reliability is not obtained, NG determination is performed.

In operation S307, if U is not greater than B, integration time T is replaced by t2 (S315), and the method returns to operation S302 such that the time T may be converted to increase the power of the light-transmitting unit and detection capability.

As described above, a TTL active AF operation is performed.

Figure 38:
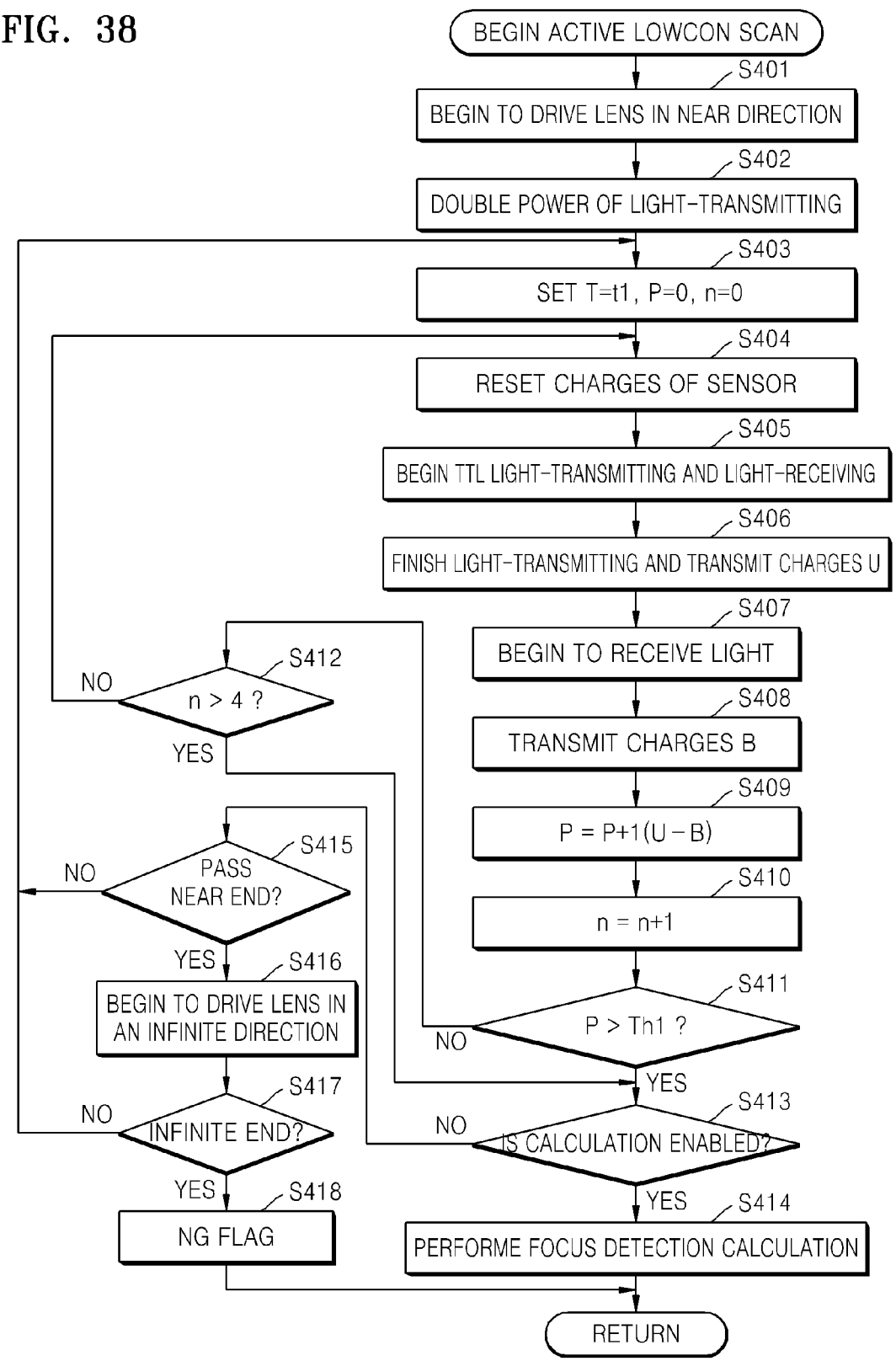

FIG. 38 is a flowchart illustrating a subroutine of a Lowcon scan operation of TTL active AF that is one of TTL AF methods, according to an embodiment. When a digital photographing apparatus uses TTL active AF, this subroutine is used. When the Lowcon scan operation of the TTL active AF begins, a focus lens is driven in a near direction (S401). In addition, during the Lowcon scan operation, the power of light-transmitting is doubled (S402) in order to increase detection capability.

Then, an initial value for the Lowcon scan operation is set (S403). An integration time T for light-transmitting and light-receiving is set as t1, an integration value P of a reflective optical signal is set as 0, and the number of times n of light-transmitting via the TTL active AF is set as 0. In addition, a light-receiving sensor of a light receiver resets charges before receiving light (S404).

When the preparation is finished, light-transmitting and light-receiving for the TTL active AF begin (S405). In addition, the time T elapses, light-transmitting is finished, and charges U of the light-receiving sensor are transmitted (S406). Here, the charges U contain information about both reflected light via light-transmitting and reflected light due to external light.

Then, when AF light-transmitting of a light-transmitting unit is finished, that is, when light is not emitted, the reflected light due to external light is received (S407). In addition, after the time T elapses, charges B accumulated in the light-receiving sensor are transmitted (S408). Here, the charges B contain only information about the reflected light due to external light.

Then, P+(U−B) is input as P (S409). In addition, (n+1) is input as n (S410). That is, the counted number of times for light-transmitting and light-receiving is increased.

Then, whether the integrated value P exceeds a threshold value Th1 is determined (S411). If it is determined that the integrated value P exceeds the threshold value Th1 (YES), it is determined that a focus position of a subject is not measurable, and the method proceeds to operation S413. Otherwise, it is determined that the integrated value P does not exceed the threshold value Th1 (NO), and whether n exceeds four is determined (S412). If n does not exceed four (NO), the method returns to operation S404 to repeat light-transmitting, light-receiving, and integration operations.

Otherwise, if n exceeds 4 (YES of S412) or if the integrated value P exceeds the threshold value Th1 in operation S411, whether a focus detection calculation is enabled is determined (S413). This is because when the method is performed from operation S412, the focus detection calculation is not enabled.

If the focus detection calculation is enabled (YES of S413), a position of an image of reflected light is detected by using information about P. In addition, the focus detection calculation is performed based on the result (S414), the method exits the subroutine.

On the other hand, if the focus detection calculation is not enabled (NO of S413), whether the focus lens passes a near end is determined (S415). When the focus lens passes the near end (YES), the focus lens is driven in an infinite direction (S416). That is, a TTL active AF operation in an opposite direction is performed. Then, whether the focus lens is positioned at an infinite end is determined (S417).

If the focus lens passes the near end in operation S415 and does not reach the infinite end in operation S417 (NO), the method returns to operation S403 in order to continuously perform a scan operation. In addition, if it is determined that the focus lens reaches the infinite end in operation S417 (YES), an NG flag indicating that the focus detection fails is set, and the method exits the subroutine (S418).

As described above, the Lowcon scan operation is performed.

Figure 39:
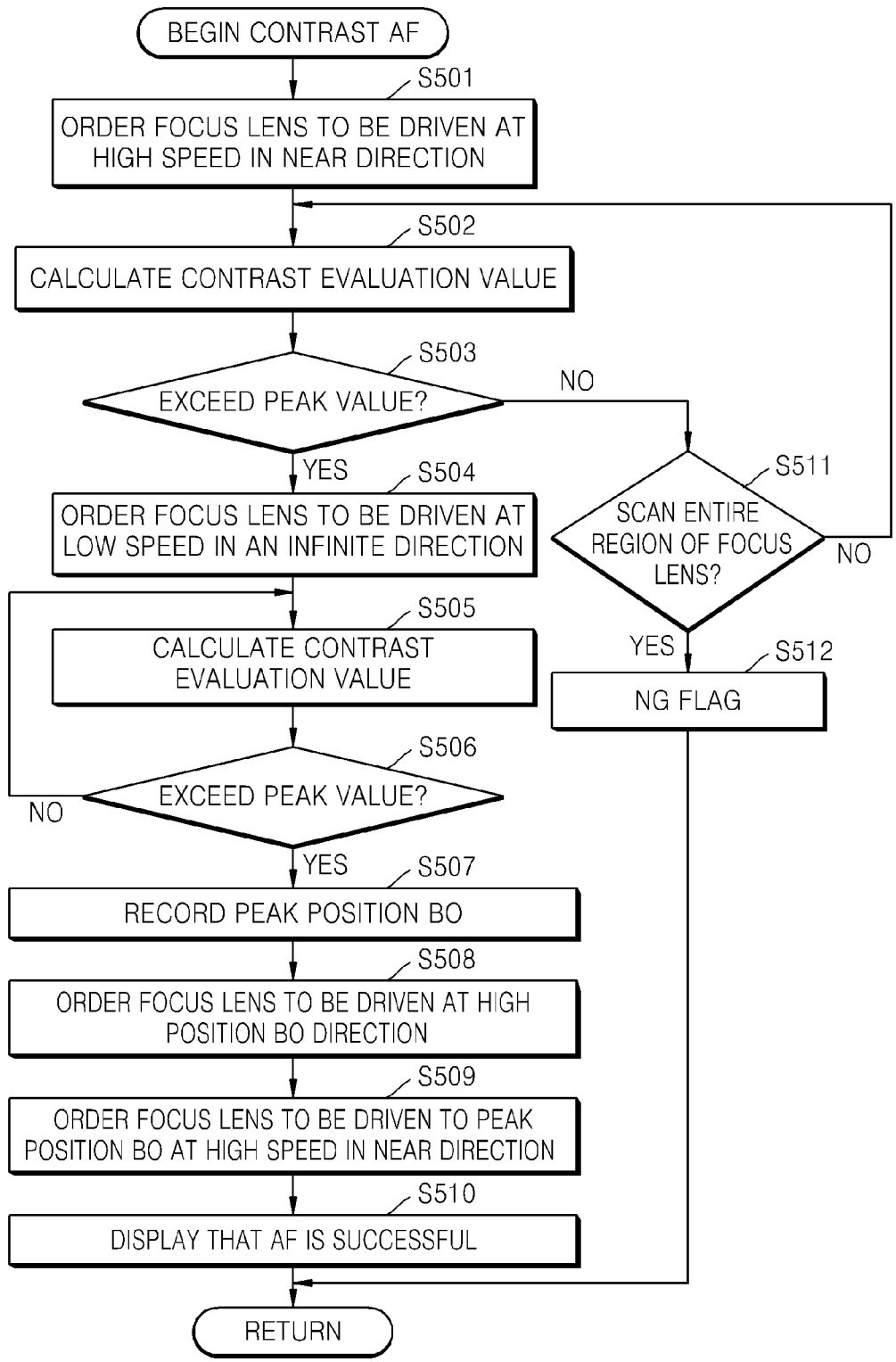

FIG. 39 is a flowchart illustrating a subroutine of a contrast AF operation, according to an embodiment.

A digital photographing apparatus orders the focus lens to be driven in a near direction at a high speed when a contrast AF operation begins (S501). While the focus lens is driven, AF detection, that is, a contrast evaluation value, is calculated (S502).

Whether the contrast evaluation value exceeds a peak value is determined (S503). If the contrast evaluation value does not exceed the peak value (NO), operation S511 is performed. In operation S511, whether an entire driving region of the focus lens is scanned is determined. If the entire driving region is not completely scanned (NO of S511), AF detection is continuously performed in operation S502. When the entire driving region is completely scanned (YES of S511), an NG flag indicating that a focus position is not achieved is output and the method returns to operation S512. On the other hand, if it is determined that the contrast evaluation value exceeds a peak value (YES of S503), the digital photographing apparatus orders the focus to be driven in an infinite direction at a low speed (S504). Here, a driving speed of the focus lens is reduced in order to precisely detect a peak position.

As a result of operation S504, a contrast evaluation value is calculated again while the focus lens is driven in an opposite direction (S505), and whether the contrast evaluation value exceeds a peak value is determined again (S506). If the contrast evaluation value does not exceed the peak value (NO), the method returns operation S505. Otherwise, if the contrast evaluation value exceeds the peak value (YES), a detected peak value B0 is recorded.

In order to correct backrush in a driving direction of the focus lens, the focus lens is driven in a near direction at a high speed by as much as a predetermined degree so as to pass a peak position (S508). In addition, after the focus lens exceeds the peak position B0, a driving direction of the focus lens is changed, and the digital photographing apparatus orders the focus lens to be driven at a high speed toward the peak position B0 (S509). When the focus lens reaches a focus position, that an AF operation is successful is displayed, or a preparation flag indicating that the AF operation is successful is displayed (S510), and the method exits from the subroutine. As described above, a contrast AF operation is performed.

As described above, a focus detecting apparatus according to various embodiments may also continuously perform AF during continuous photography and under a low-brightness environment.

Figure 40:
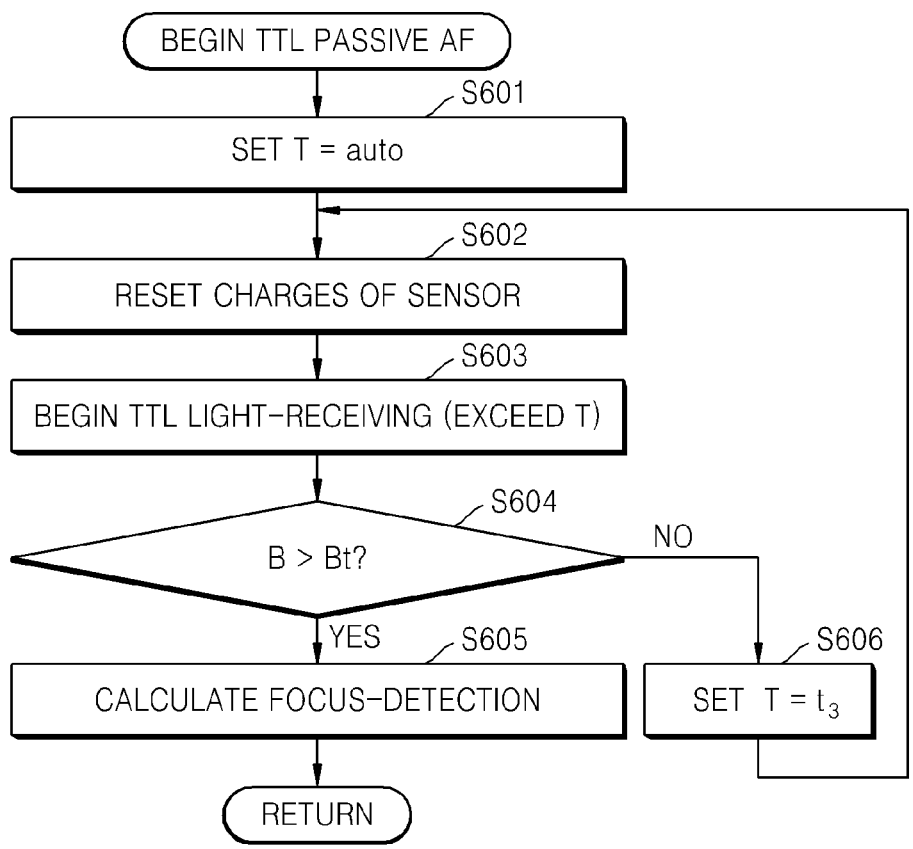

FIG. 40 is a flowchart illustrating a subroutine of TTL passive AF that is one of the TTL AF methods, according to an embodiment. When a digital photographing apparatus uses the TTL passive AF, this subroutine is used. When the TTL passive AF begins, an initial value of an integration time T is set. In order to automatically determine and control an optical amount in an AF sensor, T=AUTO is set (S601). In addition, a light-receiving sensor of a light receiver resets charges before receiving light (S602).

When the preparation is finished, an AF sensor begins to receive light (S603). A time to receive light is dependent upon an amount of charges of the AF sensor, and is terminated automatically (S603). In addition, an integrated value B of a subject is determined (S604). If the integration value B is greater than a threshold value Bt (YES), a calculation for a phase difference relationship and a calculation for detecting a focus position are performed (S605), and the subroutine exits. Otherwise, if the integration value B is smaller than the threshold value Bt (NO of S604), it is determined that an integrated value is not sufficient by using automatic integration of the AF sensor, and a time t3 that exceeds an automatic integration limited-time that is set in the AF sensor is set as T (S606). t3 may be a shake-limited time that is determined according to a focus distance of an exchangeable lens. In addition, the method returns to operation S602 to detect a focus again.

Figure 41:
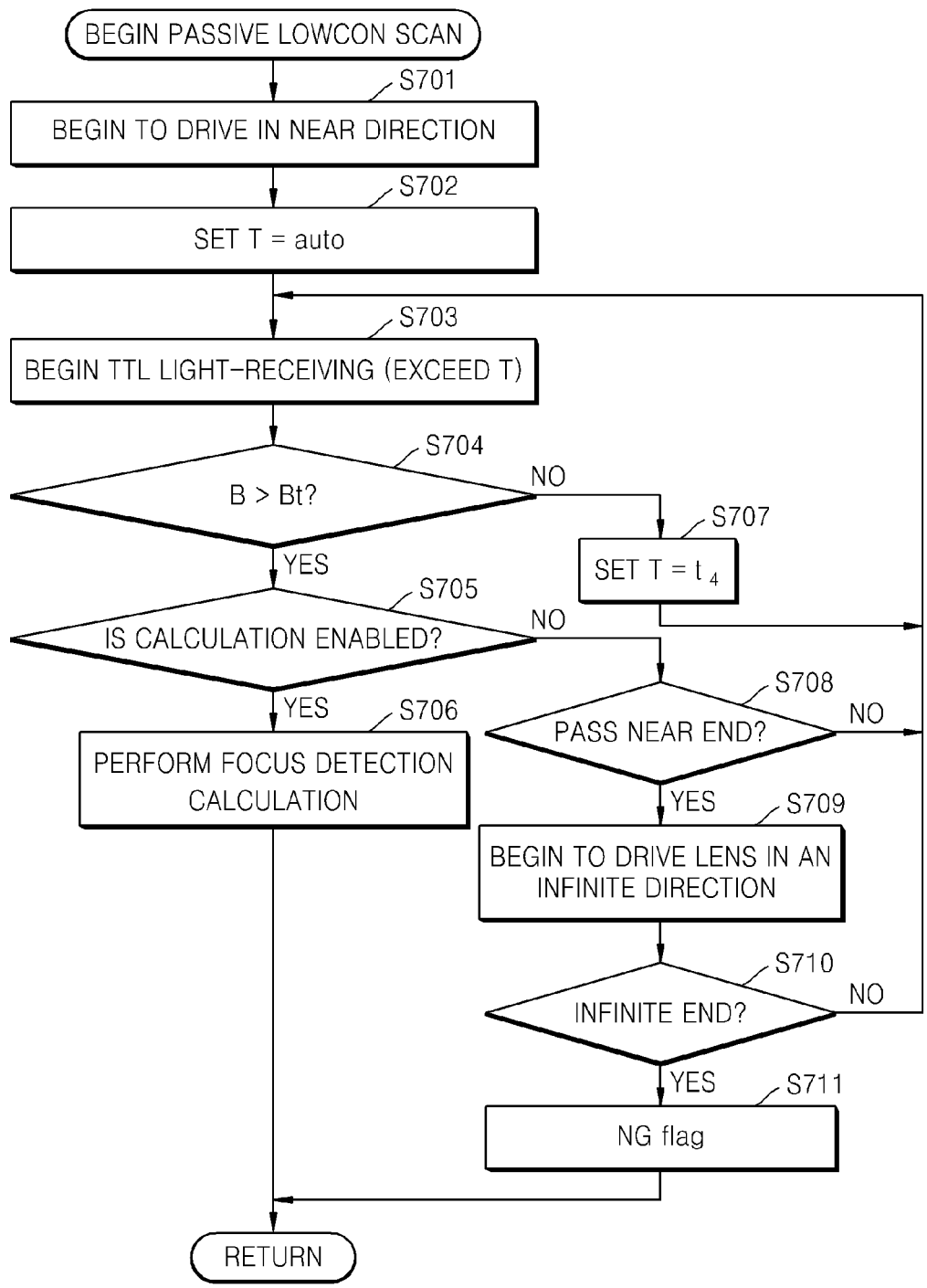

FIG. 41 is a flowchart illustrating a subroutine of a Lowcon scan operation of TTL passive AF that is one of the TTL AF methods, according to an embodiment. When a digital photographing apparatus uses the TTL passive AF, this subroutine is used.

When the Lowcon scan operation of TTL passive AF is begun, a focus lens is driven in a near direction (S701). In addition, in order to automatically determine and control an optical amount in an AF sensor, T=AUTO is set (S702). In addition, an AF sensor begins to receive light (S703), and integration begins. An integrated value B is determined (S704). If the integration value is greater than a threshold value Bt (YES), the method proceeds to operation S705. Otherwise, if the integration value is smaller than the threshold value Bt (NO), a time t4 that exceeds an automatic integration-limited time that is set in the AF sensor is set as T (S707). In addition, in operation S703, a focus is detected again. In operation S705, whether the focus detection calculation is enabled is determined. This is because even if the integrated value B is sufficient, the focus detection calculation is not enabled during the AF Lowcon scan operation. That is, when a defocus degree is too high or contrast is too low, since a focus is not detectable, whether the focus detection calculation is enabled is determined here. If a focus is detectable (YES of S705), a calculation for a phase difference relationship and a calculation for detecting a focus position are performed (S706), and the subroutine exits. Otherwise, if the focus is not detectable (NO of S705), whether the focus lens reaches a near end is determined in operation S708. If the focus lens does not reach a near end (NO), the method returns to operation S703, and the Lowcon scan operation is continuously performed. Otherwise, if the focus lens reaches the near end (YES of S708), the focus lens is reversely driven in an infinite direction in operation S709. In addition, whether the focus lens reaches the near end is determined (S710). If the focus lens does not reach the near end (NO), the method returns to operation S703, and the Lowcon scan operation is continuously performed. Otherwise, if the focus lens reaches the infinite end (YES), operation S711 is performed. If the focus lens reaches the infinite end in operation S711, a focus is not detected at all. Thus, an NG flag is output and the subroutine exits.

Thus far, the case where an AF method used in a digital photographing apparatus is a TLL active AF method or a TTL passive AF method has been described. However, since TTL image plane phase difference AF is similar to the TTL passive AF method, a flowchart of the TTL image plane phase difference AF is omitted. The TTL image plane phase difference AF is different from the TTL passive AF method in that AF integration is dependent upon an integration period of a live view since an AF sensor is not independent. That is, the integration period is 30 fps, 60 fps, or 120 fps, which is a period of a live view and is selected according to the brightness of a subject. In addition, the integration timing is timing when a live view is displayed or timing during exposure. In addition, a calculation for a phase difference relationship and a calculation for detecting a focus position or control of a Lowcon scan operation may be performed together with the control of TTL passive AF.

As described above, a digital photographing apparatus according to the one or more embodiments may also perform AF in consideration of iris adjustment or shutter control timing during continuous photography, and thus, continuous photography may be precisely performed.

In addition, during continuous photography, a live view may be also displayed, and a subject may be tracked in real time.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A digital photographing apparatus comprising:
   an image pickup lens that transmits light from a subject;
   an image pickup device that captures light transmitted through the image pickup lens to generate an image signal;
   an iris that controls an amount of the light transmitted through the image pickup lens;
   a shutter that controls exposure of the image pickup device;
   a focus detector that detects a focus using light transmitted through a predetermined exit pupil region of the image pickup lens; and
   a timing unit that controls a time for closing and/or opening the shutter, when the image pickup device outputs image information,
   wherein:
   the focus detector detects a focus when the iris has an iris value for ensuring transmission of a light flux used to detect the focus, after the exposure of the image pickup device is finished;
   the focus detector comprises a phase difference detecting pixel that detects a phase difference of the image pickup device, and the focus is detected using an image plane phase difference autofocus (AF) method that uses light received by the phase difference detecting pixel;

the focus is detected after the iris value reaches a maximum-opening iris value of the image pickup lens; and wherein light is received to detect a focus when the shutter is opened, a focus detection calculation is performed when the shutter is opened, and a focus lens is driven at a time when the shutter is closed.

2. The digital photographing apparatus of claim 1, wherein, after the exposure is finished, when the iris is being restored to an open state, if an iris value required to detect the focus is satisfied, the focus detector detects the focus.

3. The digital photographing apparatus of claim 1, wherein the digital photographing apparatus is a digital single-lens translucent camera or a mirrorless camera.

4. The digital photographing apparatus of claim 1, further comprising a display unit that displays a live view during continuous photography.

5. The digital photographing apparatus of claim 1, wherein, after the exposure is finished, while the image pickup device outputs the image information, the iris is also adjusted.

6. The digital photographing apparatus of claim 1, wherein before photography is performed, the iris is fixed to have an iris value less than an iris value required to detect phase difference focuses.

7. The digital photographing apparatus of claim 1, wherein the focus detector also detects the focus when the image pickup device outputs the image information.

8. The digital photographing apparatus of claim 1, wherein the focus detector also detects the focus when the image pickup device is exposed.

9. The digital photographing apparatus of claim 1, wherein the focus detector detects the focus using the image plane phase difference AF method while displaying a live view or during photography when the shutter is opened.

10. A digital photographing apparatus comprising:

an image pickup lens that transmit light from a subject;

an image pickup device that captures light transmitted through the image pickup lens to generate an image signal;

an iris that controls an amount of the light transmitted through the image pickup lens;

a shutter that controls exposure of the image pickup device;

a through the lens (TTL) phase difference focus detector that detects a focus using light transmitted through a predetermined exit pupil region of the image pickup lens; and a controller that controls a time for closing and/or opening the shutter, when the image pickup device outputs image information, wherein:

the TTL phase difference focus detector determines a time when the shutter is not moving and detects the focus when the iris is adjusted to detect the focus using a TTL phase difference AF method;

the focus is detected after the iris value reaches a maximum-opening iris value of the image pickup lens; and wherein light is received to detect a focus when the shutter is opened, a focus detection calculation is performed when the shutter is opened, and a focus lens is driven at a time when the shutter is closed.

11. The digital photographing apparatus of claim 10, further comprising a display unit that displays a live view during continuous photography.

* * * * *